(12) United States Patent
Frey et al.

(10) Patent No.: US 7,059,428 B2
(45) Date of Patent: Jun. 13, 2006

(54) MONITORING A RESERVOIR IN CASING DRILLING OPERATIONS USING A MODIFIED TUBULAR

(75) Inventors: Mark Frey, Sugar Land, TX (US); David L. Smith, Sugar Land, TX (US); Brian Clark, Sugar Land, TX (US); Jan Smits, Sugar Land, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 191 days.

(21) Appl. No.: 10/761,045

(22) Filed: Jan. 20, 2004

(65) Prior Publication Data
US 2004/0149434 A1 Aug. 5, 2004

Related U.S. Application Data

(60) Continuation-in-part of application No. 10/453,231, filed on Jun. 3, 2003, now Pat. No. 6,863,127, which is a division of application No. 09/535,995, filed on Mar. 27, 2000, now Pat. No. 6,614,229.

(51) Int. Cl.
*E21B 47/00* (2006.01)

(52) U.S. Cl. .................. 175/50; 73/152.03; 175/40; 175/57

(58) Field of Classification Search .............. 175/40, 175/50, 57, 171; 73/152.03, 152.46; 324/333, 324/356
See application file for complete search history.

(56) References Cited

U.S. PATENT DOCUMENTS

| 4,544,041 A | * | 10/1985 | Rinaldi | .................. | 175/57 |
| 4,899,112 A | | 2/1990 | Clark et al. | | |
| 4,949,045 A | | 8/1990 | Clark et al. | | |
| 5,065,619 A | | 11/1991 | Myska | | |
| 5,233,304 A | | 8/1993 | Hubans | | |
| 5,293,937 A | | 3/1994 | Schultz et al. | | |
| 5,339,036 A | | 8/1994 | Clark et al. | | |
| 5,372,208 A | | 12/1994 | Mefferd | | |
| 5,426,367 A | | 6/1995 | Martin | | |
| 5,472,057 A | * | 12/1995 | Winfree | .................. | 175/57 |
| 5,485,089 A | | 1/1996 | Kuckes | | |
| 5,530,358 A | | 6/1996 | Wisler et al. | | |
| 5,563,512 A | | 10/1996 | Mumby | | |
| 5,642,051 A | | 6/1997 | Babour et al. | | |

(Continued)

FOREIGN PATENT DOCUMENTS

GB 2 344 127 A 5/1999

(Continued)

OTHER PUBLICATIONS

James, J. Smolen, Production Logging in Horizontal Wells, Jun. 19, 1994, 35th Annual SPWLA Symposium, Tulsa, OK.

(Continued)

*Primary Examiner*—Hoang Dang
(74) *Attorney, Agent, or Firm*—Kevin P. McEnaney; Brigitte L. Jeffrey; Dale Gaudier

(57) ABSTRACT

Characteristics of a reservoir are monitored during a casing drilling operation using a casing drilling assembly that includes a drill bit for drilling a borehole through an earth formation. A casing tubular is coupled with the casing drilling assembly and includes at least one station having at least one slot in the casing tubular. An antenna or sensor, adapted for signal transmission and/or reception, is disposed within the casing tubular and positioned such that the antenna or sensor is aligned with the at least one slotted station. The antenna or sensor is activated during a casing drilling operation to transmit and/or receive a signal.

24 Claims, 31 Drawing Sheets

U.S. PATENT DOCUMENTS

| | | | |
|---|---|---|---|
| 5,692,565 A | 12/1997 | MacDougall et al. | |
| 5,706,896 A | 1/1998 | Tubel et al. | |
| 5,765,637 A | 6/1998 | Dietle et al. | |
| 5,939,885 A | 8/1999 | McClure et al. | |
| 6,070,662 A | 6/2000 | Ciglenec et al. | |
| 6,236,620 B1 * | 5/2001 | Schultz et al. | 367/82 |
| 6,288,548 B1 | 9/2001 | Thompson et al. | |
| 6,294,917 B1 | 9/2001 | Nichols | |
| 6,369,718 B1 | 4/2002 | Mathieu | |
| 6,378,607 B1 | 4/2002 | Ryan et al. | |
| 6,943,697 B1 * | 9/2005 | Ciglenec et al. | 340/853.1 |
| 2002/0023746 A1 | 2/2002 | Ringgenberg et al. | |
| 2004/0149434 A1 * | 8/2004 | Frey et al. | 166/250.1 |
| 2004/0262013 A1 * | 12/2004 | Tilton et al. | 166/380 |

FOREIGN PATENT DOCUMENTS

| | | |
|---|---|---|
| GB | 2 354 026 A | 8/2000 |
| GB | 2361547 | 10/2001 |
| GB | 2371870 | 8/2002 |
| GB | 2374936 | 10/2002 |
| GB | 2382143 | 5/2003 |
| WO | WO 94/00669 | 6/1992 |

OTHER PUBLICATIONS

Michael Wilt, Crosshole electronmagnetic tomography: A new technology for oil field characterization, Mar. 1995, The Leading Edge, pp. 173-177.

Exploring Oil Fields with Crosshole Electromagnetic Induction, Aug. 1996, Internet, pp. 1-6.

Q. Zhou, et al., Reservoir Monitoring with Interwell Electronmagnetic Imaging, May 30, Jun. 3,1999, 1999, SPWLA 40th Annual Logging Symposium, pp. 1-10.

Valley Perforating Co., Perforating Options, Jul. 13, 1999, Copyright 1996, Internet.

* cited by examiner

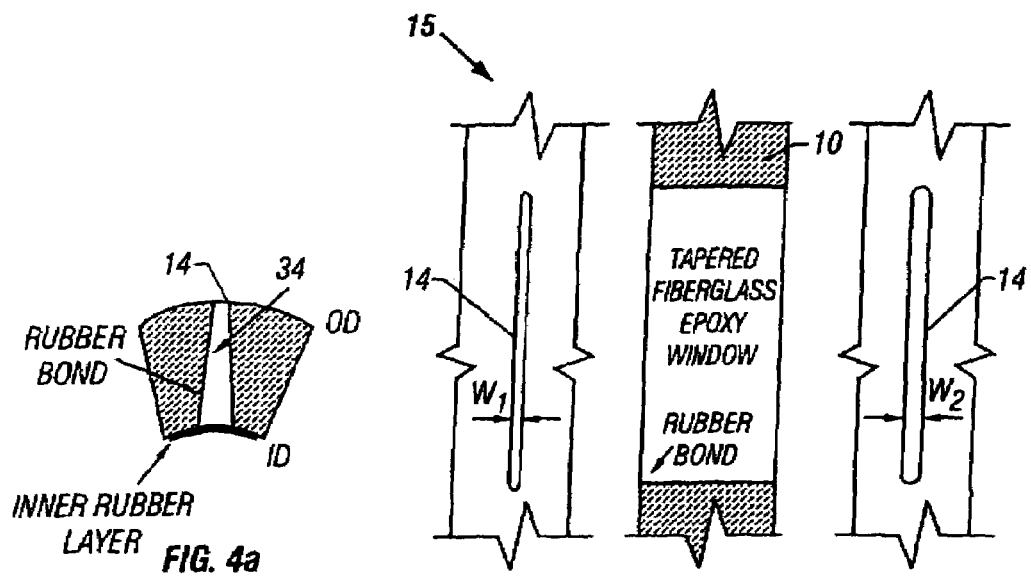
FIG. 4a
FIG. 4b
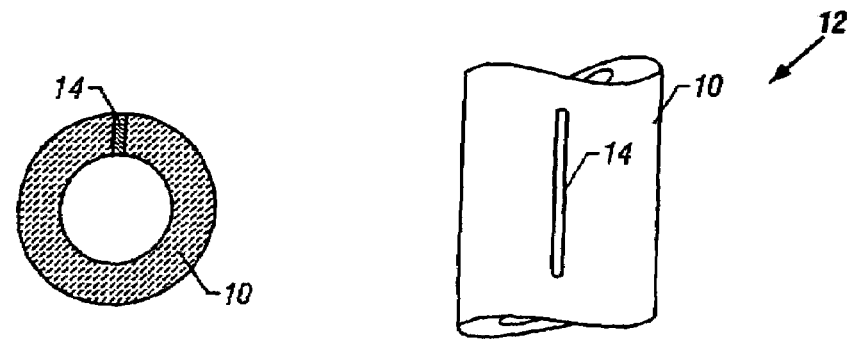
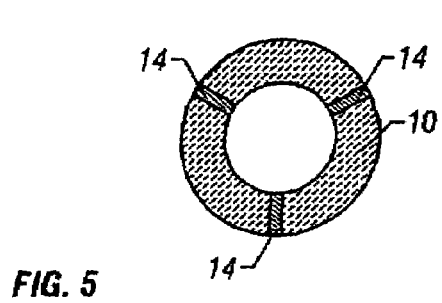
FIG. 5

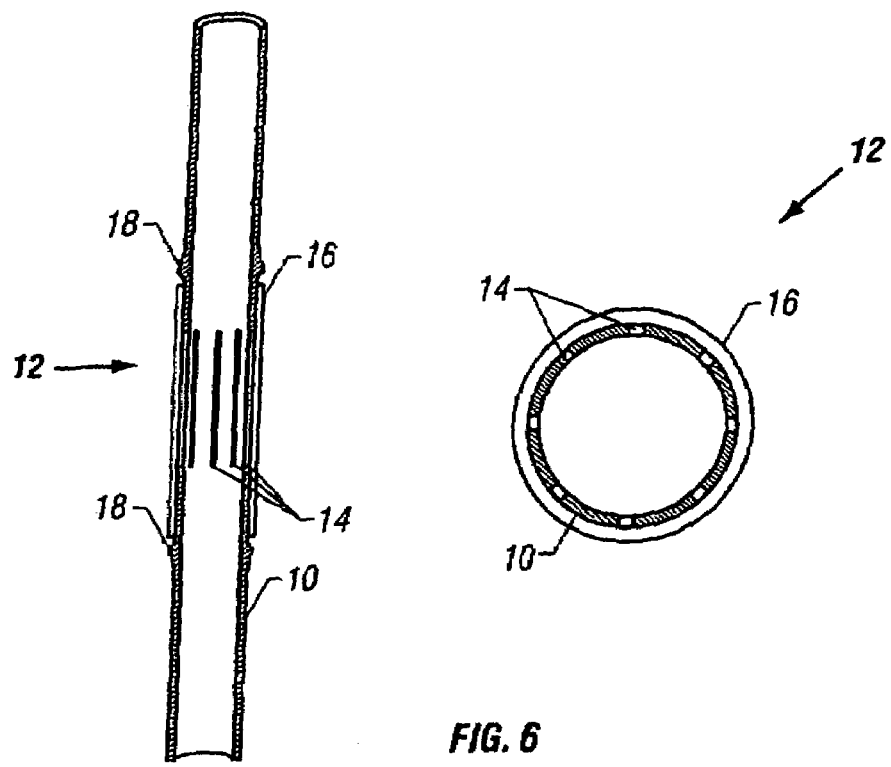
FIG. 6
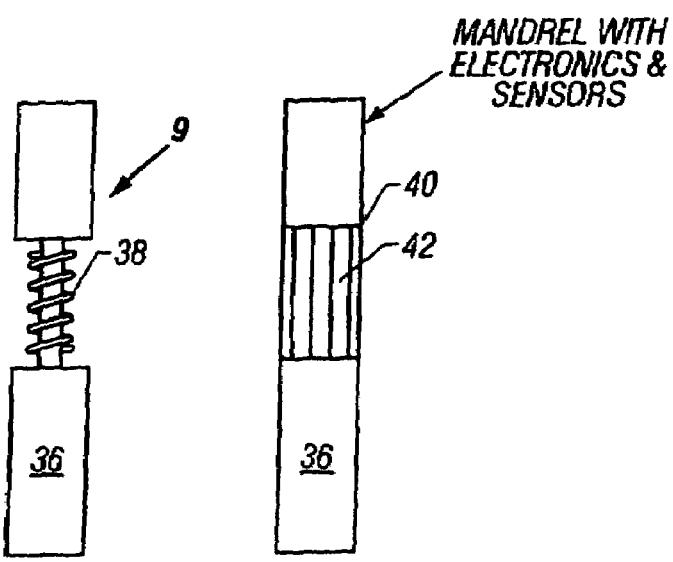
FIG. 7a  FIG. 7b

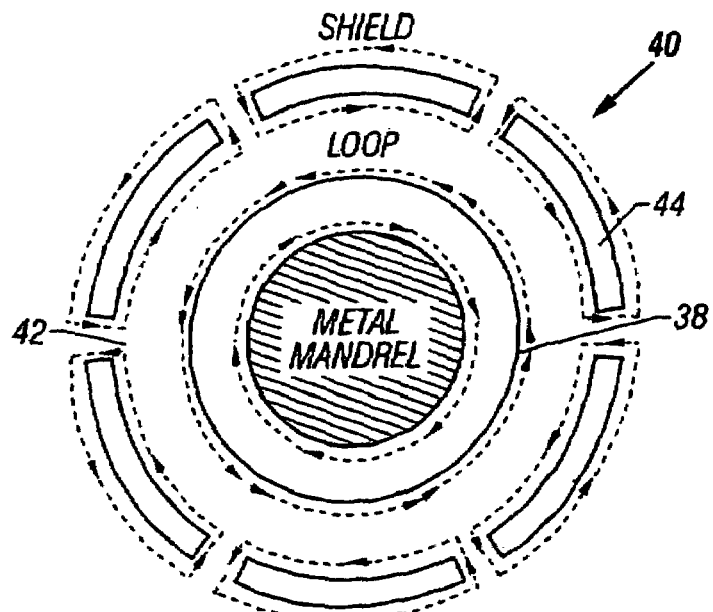
FIG. 8
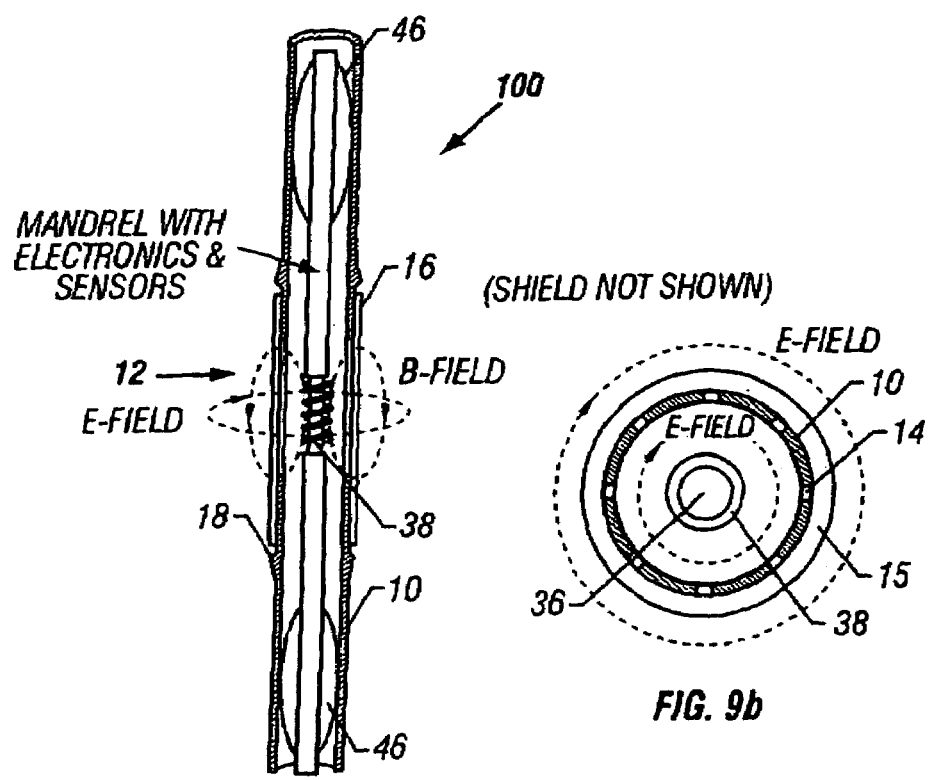
FIG. 9a
FIG. 9b

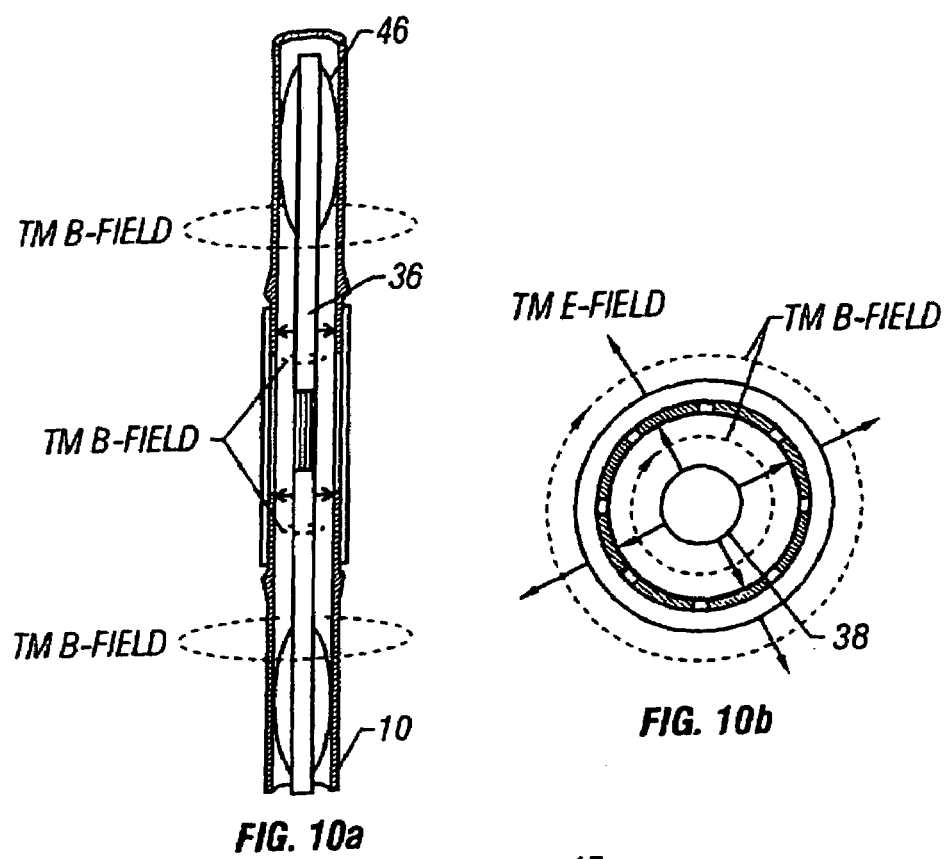
FIG. 10a
FIG. 10b
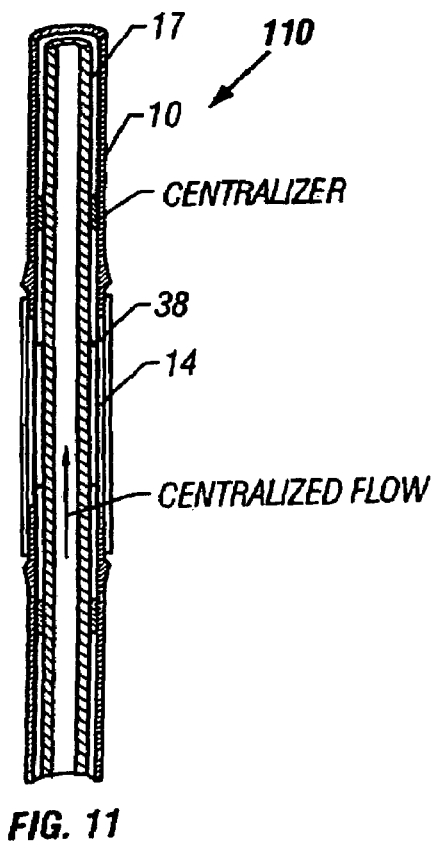
FIG. 11

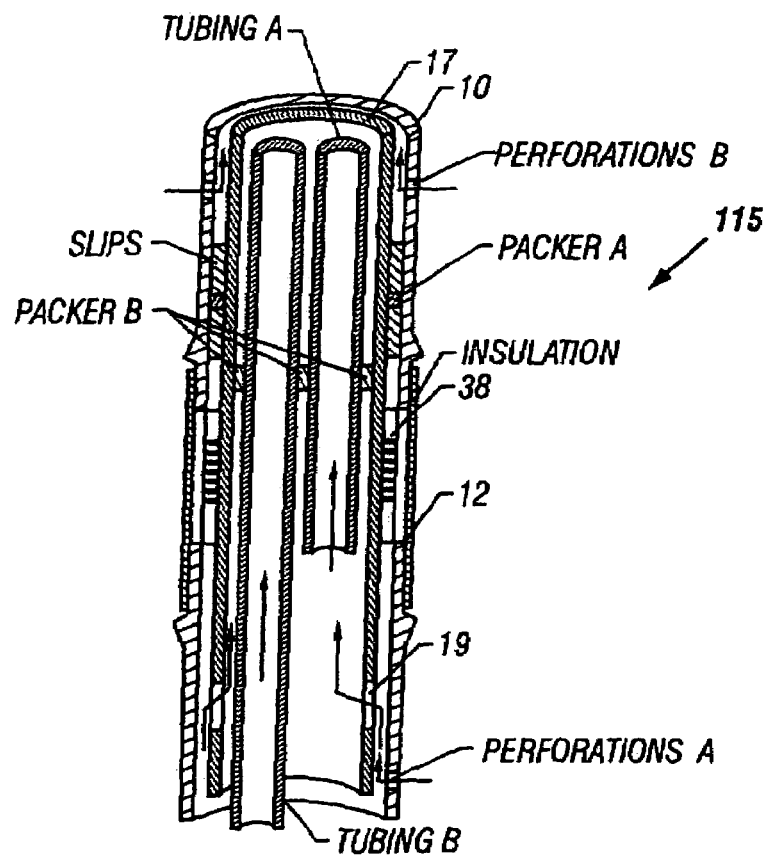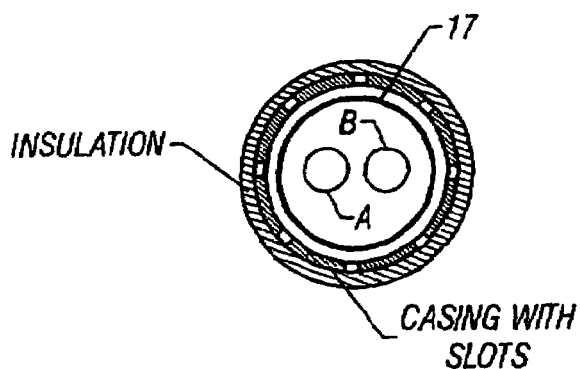
FIG. 12

MULTIPLE DEPTHS OF INVESTIGATION

DISPOSE A TUBULAR WITHIN THE BOREHOLE, THE TUBULAR INCLUDING A SLOTTED STATION AND MEANS TO HYDRAULICALLY ISOLATE THE TUBULAR INTERIOR FROM A SUROUNDING BOREHOLE AT THE SLOTTED STATION, THE TUBULAR ADAPTED TO RECEIVE A SENSOR OR ANTENNA FOR MONITORING A FORMATION CHARACTERISTIC

MONITORING A RESERVOIR IN CASING DRILLING OPERATIONS USING A MODIFIED TUBULAR

CROSS REFERENCE TO RELATED APPLICATIONS

This application is a continuation-in-part of prior application Ser. No. 10/453,231, filed Jun. 3, 2003, now U.S. Pat. No. 6,863,127 which is a divisional of prior application Ser. No. 09/535,995, filed Mar. 27, 2000 now U.S. Pat. No. 6,614,229.

1. BACKGROUND OF THE INVENTION

1.1 Field of the Invention

This invention relates to the field of reservoir characterization. More particularly, this invention relates to an improved technique for transmitting and/or receiving signals through a tubular such as casing or a liner to measure reservoir characteristics in casing drilling operations.

1.2 Description of Related Art

Petroleum is usually produced from oil reservoirs sufficiently far below a gas cap and above an aquifer. As the oil zone is being produced and depleted, the gas cap starts coning downward and the aquifer coning upwards towards the oil bearing zone. Such migration can adversely affect the extraction of petroleum by creating pockets that are missed by the producer and by saturating the oil deposits with water. As soon as either gas or water hits the well, its oil production usually ceases instantly.

Reservoirs are monitored for changes in saturation and early signatures of coning so that corrective action can be taken. One approach utilizes pulsed neutron measurements, which measure formation sigma (indicative of saline water) or carbon-oxygen ratios (indicative of the ratio of hydrocarbon to water). The primary disadvantages of such pulsed neutron measurements are shallow depth of investigation and low accuracy in low porosities. A shallow measurement can be fooled by water channeling behind casing, and shallow re-invasion of well fluids into the open zones (e.g., the perforated zones) when the well is not flowing.

Measuring the electrical resistivity near a borehole has long been used to determine production zones in oil and gas fields and to map sand and shale layers. Electrical resistivity depends directly on porosity, pore-fluid resistivity, and saturation. Porous formations having high resistivity generally indicate the presence of hydrocarbons, while low-resistivity formations are generally water saturated.

Cross-well monitoring is an approach to monitoring changes in reservoir saturation. This technique is an outgrowth of radar experiments conducted in the early 1970s. See Michael Wilt, *Exploring Oil Fields with Crosshole Electromagnetic Induction*, SCIENCE AND TECHNOLOGY REVIEW, August 1996 (available at <http://www.llnl.gov/str/Wilt.htm>); See also Q. Zhou et al., *Reservoir Monitoring with Interwell Electromagnetic Imaging*, SPWLA FORTIETH ANNUAL LOGGING SYMPOSIUM, May 30–Jun. 3, 1999. With this technique, a transmitter is deployed in one well and a receiver is deployed in a second well. At the receiver borehole, the receiver detects components of the transmitted and induced currents for determination of the reservoir characteristics between the wells.

This approach has been studied for wells with fiberglass casing. The technique was used to monitor water-saturation changes in heavy oil zones undergoing steam flooding. See Michael Wilt et al., *Crosshole electromagnetic topography: A new technology for oil field characterization*, THE LEADING EDGE, March 1995, at 173–77. However, this technique is presently limited to closely spaced wells with either open-hole completions or cased with insulating composites. The disadvantages of these systems include the fragility and expense of fiberglass casing, making the technique impractical for use in production wells. Moreover, drilling a special well for monitoring is very expensive and therefore rarely done.

Another proposal for surveying and monitoring a reservoir is to deploy electrodes on the exterior of the casing. U.S. Pat. No. 5,642,051 (assigned to the present assignee) describes a casing, which has external insulation, electrodes, and cables for use in the completion. Its disadvantages include: the fragility of the external hardware and cable, the difficulty of running a complex completion into the well, the logistics of running a wire outside of the casing from surface to downhole, the inability to repair damaged or malfunctioning components, the difficulty to guarantee a hydraulic seal between the casing and the formation with external cables present, the possibility of cross-talk between these cables, the difficulty to place preamplifiers and other electronics near the electrodes, electrode impedance effects, and the influence of the cement annulus on resistivity.

Downhole techniques have been proposed utilizing slotted tubes or slotted liners. U.S. Pat. No. 5,372,208 describes the use of slotted tube sections as part of a drill string to sample ground water during drilling. A Slotted liner is a completion method used to prevent the wellbore from collapsing, and may also be used to prevent sand grains and other small particles from entering the wellbore and forming debris piles which may restrict fluid flow. A slotted liner is most often used in a horizontal well and is within a single producing formation. It is an alternative to leaving the hole completely open (i.e., with no casing), when an open hole may collapse or become blocked with debris. However, these types of slotted tubes or liners are not cemented in the wellbore, and do not provide hydraulic isolation from one well section to another. Slotted liners may be obtained from manufacturers such as *Valley Perforating Co.* of Bakersfield, Calif. (information available at <http://www.valleyperf.com/perf.htm>). See also James J. Smolen, *Production Logging In Horizontal Wells*, SPWLA THIRTY-FIFTH ANNUAL SYMPOSIUM, workshop notes, Tulsa, Okla., Jun. 19, 1994.

These technologies have not been readily applicable to measurement and monitoring techniques using steel-cased production wells. The steel casing dramatically attenuates electromagnetic ("EM") signals, restricting the possible use of known techniques primarily to qualitative detection of high resistive zones, but not for quantitative saturation measurements. For the cross-well technique to be successful in cased holes, it has been proposed to run at extremely low frequencies so that the magnetic fields can penetrate steel casing. However, such an approach is extremely sensitive to the magnetic and electric properties of the casing, and it has not been successfully demonstrated.

Another technology area has been gaining in acceptance and also has the drawbacks associated with steel casing is casing drilling operations. Casing drilling uses standard oilfield casing to simultaneously drill and case the well. The completion casing is used as drill pipe, eliminating the expense of having drill pipe at the well-site. A drilling assembly is employed which drills a borehole of sufficient width to receive the casing. The bottom hole assembly (BHA) typically consists of a drill bit, an under-reamer, and collars used to lock the BHA to the bottom of the casing. At the rig surface, casing joints are picked up from the pipe rack and set into the mouse hole. A top drive is connected to the top of the casing joint that is then stabbed into the top of the casing string on a rotary table. The system utilizes a top drive to rotate the casing. In addition, mud motors and directional motors can also be used as part of the BHA.

A casing drilling BHA can be tripped into, and out of, the casing using a strong wireline cable. Specifically, a drill bit is sized to to pass through the casing. An underreamer is typically used to open the borehole sufficient to accommodate the casing. As such, drills bits can be replaced without pulling the casing from the well. In fact, a large advantage to casing drilling is the fact that the casing, once in place, should not need to be moved.

While much activity and progress has been made relating to the drilling process in casing drilling operation, there has been little to no focus on making formation evaluation measurements during casing drilling. In fact, as with cross-well technology, the casing acts as a barrier to the passage of signals necessary to make formation resistivity measurements.

One approach to obtain resistivity measurements through casing is discussed in U.S. Pat. Nos. 6,545,477 and 6,351,129. The approach disclosed in these patents consists of first causing a current to flow along the casing with a remote return current. A leakage current leaks through the casing toward the geological formation. The formation conductivity is evaluated based on the amount of leakage current. Another approach for resistivity measurements in conjunction with casing drilling requires the BHA to be tripped out, along with a portion of the casing. Essentially, the approach is an open-hole log with the desired formation exposed to the measurement device.

Thus, there remains a need for a technique for measuring and/or monitoring the characteristics of subterranean formations through steel casing. It is desirable to implement a technique that provides transparency for the passage of a signal through a tubular such as steel casing while maintaining hydraulic isolation between the tubular and the surrounding formations. It is also desired to implement a technique for through-casing signal-transmission and/or reception to place wells with greater accuracy.

2. SUMMARY OF THE INVENTION

Characteristics of a reservoir are monitored during a casing drilling operation using a casing drilling assembly that includes a drill bit for drilling a borehole through an earth formation. A casing tubular is coupled with the casing drilling assembly and includes at least one station having at least one slot in the casing tubular. An antenna or sensor, adapted for signal transmission and/or reception, is disposed within the casing tubular and positioned such that the antenna or sensor is aligned with the at least one slotted station. The antenna or sensor is activated during a casing drilling operation to transmit and/or receive a signal.

3. BRIEF DESCRIPTION OF THE DRAWINGS

Other aspects and advantages of the invention will become apparent upon reading the following detailed description and upon reference to the drawings in which:

FIGS. 4a and 4b are cross-sectional views and cut-away perspectives of a casing station with a tapered slot and a corresponding tapered wedge in accord with the invention.

FIG. 5 illustrates several cross-sectional views and a front plan view of slotted casing stations in accord with the invention.

FIG. 6 is a schematic diagram and cross-sectional view of the tubular segment of FIG. 1 showing a slot configuration in accord with the invention.

FIG. 7a is a schematic diagram of a mandrel structure with a multi-coil antenna in accord with the invention.

FIG. 7b is a schematic diagram of the mandrel structure of FIG. 7a showing a shield surrounding the antenna in accord with the invention.

FIG. 8 is a cross-sectional view of the electromagnetic interaction between a coil antenna and shield assembly of the invention.

FIG. 9a is a schematic diagram of a source/sensor system within a slotted casing station in accord with the invention.

FIG. 9b is a cross-sectional view of the electromagnetic interaction between the source/sensor system and slotted casing station of FIG. 9a.

FIGS. 10a and 10b are respectively schematic and cross-sectional views of the source/sensor system of FIG. 9a showing the distribution of transverse magnetic waves.

FIG. 11 is a schematic diagram of a source/sensor system mounted on a tubular within the casing in accord with the invention.

FIG. 12 is a schematic diagram of a permanent monitoring installation in accord with the invention.

FIG. 38 is a flow chart illustrating a method for monitoring a reservoir characteristic in conjunction with the casing drilling system of FIG. 29a.

4. DETAILED DESCRIPTION OF SPECIFIC EMBODIMENTS

In the interest of clarity, not all features of actual implementation are described in this specification. It will be appreciated that although the development of any such actual implementation might be complex and time-consuming, it would nevertheless be a routine undertaking for those of ordinary skill in the art having the benefit of this disclosure.

4.1 Slotted Casing Station

Figure 1:
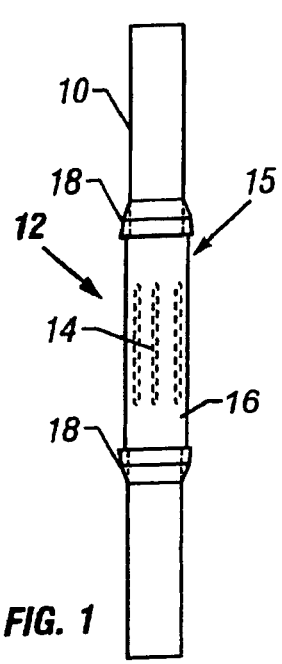
FIG. 1 is a schematic diagram of a tubular segment with a slotted station in accord with the invention.
Figure 2:
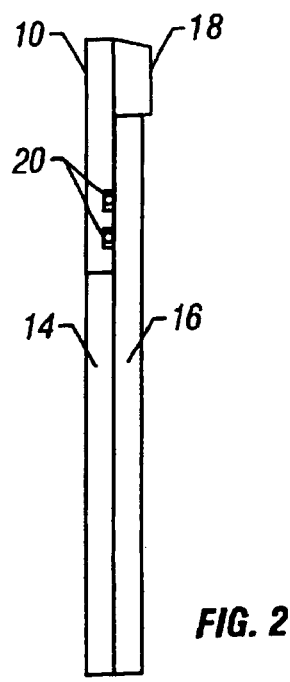
FIG. 2 is a cross-sectional view of an insulator placed over a slotted station on the exterior of the tubular of FIG. 1 in accord with the invention.

FIG. 1 shows a tubular casing 10 segment of the invention. The metal casing 10 includes a station 12 with axial slots 14 cut through the tubular wall. Each elongated axial slot 14 fully penetrates the tubular wall of the casing 10. Hydraulic isolation between the interior and exterior of the casing 10 is provided by an insulating structure 15. The structure 15 includes an insulator 16 formed in the shape of a cylindrical tube or sleeve to enclose the slotted station 12. FIG. 2 shows a cross section of an insulator 16 placed over a slot 14 on the exterior of the casing 10. The insulator 16 is slid over the slots 14 with one or more O-rings 20 providing a seal. Alternatively, the insulator 16 may be placed inside the tubular casing 10, rather than outside (not shown).

The insulator 16 is made of an insulating material to permit the passage of EM radiation. Useable materials include the class of polyetherketones described in U.S. Pat. No. 4,320,224, or other suitable resins. *Victrex USA, Inc.* of West Chester, Pa. manufactures one type called PEEK. *Cytec Fiberite, Greene Tweed*, and BASF market other suitable thermoplastic resin materials. Another usable insulating material is Tetragonal Phase Zirconia ceramic ("TZP"), manufactured by *Coors Ceramics* of Golden, Colo. PEEK may be used for applications involving higher shock and lower differential pressures, while TZP can withstand higher differential pressure, but lower shock levels. According to finite element models, PEEK can withstand substantial pressure loading and may be used for harsh downhole conditions. Ceramics can withstand substantially higher loads, and may be used in permanent monitoring applications where shock is typically not an issue.

Protective metal upset rings 18 are mounted on the casing 10 above and below the insulator 16. The upset rings 18 protect the insulator 16 on the trip into the well, retaining the insulator 16 in position over the slots 14. The upset rings 18 may be mounted on the casing 10 in a number of ways as known in the art, e.g., spot welding or by fastener means.

Hydraulic isolation of the slotted station 12 may also be obtained by wrapping and curing fiberglass-epoxy directly on the casing 10, or PEEK can be applied at high temperature (not shown). Once in the well, the cement job will reinforce the hydraulic integrity of the insulator 16 over the slotted station.

Figure 3:
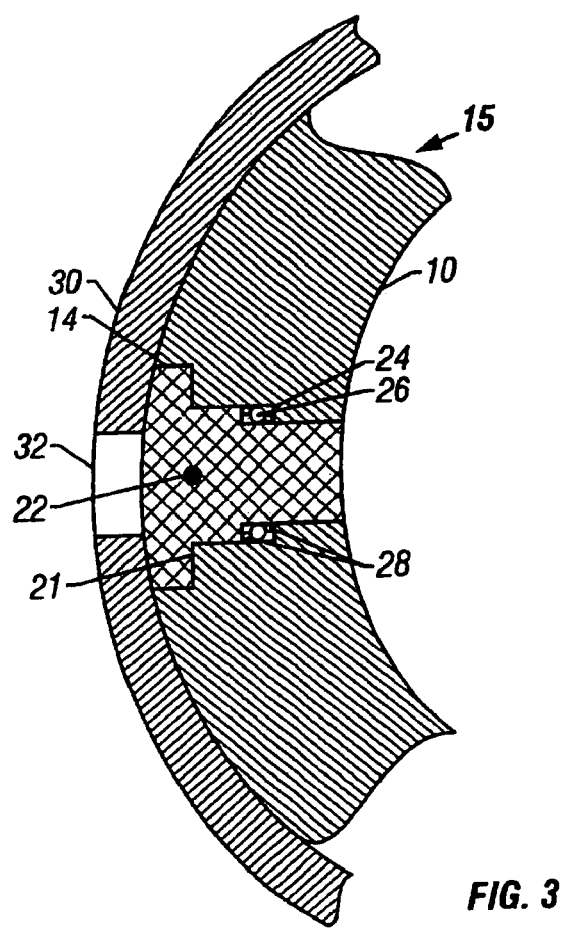
FIG. 3 is a cross-sectional view of one slot with an insert, seal, and retaining sleeve installed in accord with the invention.

FIG. 3 shows another embodiment of an insulating structure 15 of the invention. The slot 14 in the casing 10 is three stepped. One of the steps provides a bearing shoulder 21 for an insert 22, and the other two surfaces form the geometry for an O-ring groove 24 in conjunction with the insert 22. A modified O-ring seal consists of an elastic O-ring 26 stretched around the insert 22 at the appropriate step, with metal elements 28 placed on opposite sides of the O-ring 26. The metal elements 28 are preferably in the form of closed loops. The insert 22 may be formed of the same insulating materials described above or other suitable materials known in the art.

The insert 22 provides transparency to incoming or outgoing EM signals while maintaining hydraulic integrity at the slot 14. In the event of pressure reversal, a fitted retaining sleeve 30 captures the insert 22 in the slot 14, preventing the insert 22 from being dislodged. The retaining sleeve 30 also has a slot 32 cut through its wall to provide a channel for any incoming or outgoing signal. The sleeve 30 preferably has a matching slot 32 for every slot 14 in the casing 10. However, only one slot 32 in the sleeve 30 needs to be matched with a slot 14 in the casing 10 for signal communication. Since the slot 32 provides a channel for the signal, the type of material used to make the sleeve 30 is immaterial to its effectiveness.

In downhole operations, external casing pressure may push the insert 22 inward. The bearing shoulder 21 takes this load. As the external pressure increases, the O-ring 26 pushes the metal elements 28, effectively closing off an extrusion gap. As a result, there is no room for extrusion of the O-ring 26. Since the metal is much harder than the O-ring material, it does not extrude at all. The modified geometry therefore creates a scenario where a soft element (the O-ring) provides the seal and a hard element (the metal loop) prevents extrusion, which is the ideal seal situation.

FIGS. 4a and 4b show another embodiment of an insulating structure 15 of the invention. The slot 14 within the casing 10 is tapered such that the outer opening $W_1$ is narrower than the inner opening $W_2$, as shown in FIG. 4b. A tapered wedge 34 of insulating material (e.g., the materials described above) is inserted within the tapered slot 14. The wedge 34 may be bonded into the casing 10 with rubber, or a rubber layer can be applied to surround and bond the wedge 34 into the casing 10. Additionally, an annulus of rubber may be molded on the interior surface of the casing 10 to seal the wedge 34 within the slot 14. This insulating structure 15 entails minimal machining of the casing 10. Alternatively, a retaining sleeve (e.g., sleeve 30 of FIG. 3) may be placed on the interior of the casing 10 to secure the wedge 34 against the slot 14 (not shown).

Since the casing 10 will be cemented into the formation, and since the metal will carry the mechanical stresses over the slotted station 12, the requirements on the mechanical strength of the insulating structure 15 should be modest. If the completion is not cemented in the pay zone, then a pressure seal is probably not needed. It will be appreciated by those skilled in the art that these sealing concepts have applications beyond those described herein.

FIGS. 5 and 6 show various embodiments of the slotted stations 12. As will be described below, the purpose of the slots 14 is to permit EM radiation to propagate through the casing 10 in a mode known as a transverse electric ("TE") mode, while blocking transverse magnetic ("TM") radiation. As shown in FIGS. 5 and 6, there can be one or more slots 14 per station 12.

4.2 Sources and Sensors

The invention uses sources and/or sensors disposed within the casing 10 to transmit and/or receive signals through the slots 14. Turning to FIG. 7a, an elongated metallic mandrel 36 is used to support one or more sources or sensors 9, such as a multi-turn coil antenna 38 as known in the art. These antennas 38 transmit and/or receive EM energy including azimuthal, radial, or axial field components. A metal shield 40 with slots 42 surrounds each antenna 38, as described in U.S. Pat. No. 4,949,045 (assigned to the present assignee) and shown in FIG. 7b. The shield 40 protects the antenna 38 from external damage.

The mandrel 36 may be configured to support pressure, temperature, seismic, flow, hold-up or other sensors as known in the art (not shown). Such embodiments will facilitate the combination of various formation measurements e.g., resistivity with seismic surveys. The mandrel 36 also supports electronics, a downhole processor, and a wireline cable run from the surface to provide for telemetry (not shown). The power source can be local (e.g., batteries or turbine) or can be delivered from the surface via the wireline cable.

The resistivity measurements of the invention are obtained by using the coil antennas 38 to generate TE-polarized EM waves. Turning to FIG. 8, the operating principle of the antenna 38 and shield 40 configuration is illustrated. The antenna 38 is energized to carry the transmission current (represented by a double arrow) and create an azimuthally polarized electric field. This field induces a current (represented by a single arrow) in the central metal mandrel 36 and on the inside of each shield blade 44.

The current induced in each shield blade 44 flows to the edge of the blade. Here, it cannot continue azimuthally, but flows around the edge to the outside of the shield 40 and closes its loop on the outer blade surface. Thus, the outside of the shield 40 carries and effective current loop. The shields 40 are preferably radially thicker than about two skin depths to minimize any interference of the induced current flowing on the inside and the outside of the shield 40. Azimuthally, the slots 42 are preferably thinner than the width of the shield blade 44. One single slot 42 is sufficient to reliably filter the azimuthal wave.

At a receiving antenna 38, the process is reversed. The arriving (azimuthally or TE polarized) EM wave induces an azimuthal current on the outside of the shield 40. At the edge of each shield blade 44, the current flows around to the inside of the blade 44 where it closes the loop. Together, the shield blades 44 carry (on the inside) an approximately closed current loop which induces a current in the receiving antenna 38. This current signal is then processed and/or stored by the electronics downhole or sent to the surface via the wireline cable as known in the art. Any axial or radial component of the EM wave is short-circuited at the axial ends of shield 40 into the metal mandrel 36 body, thus eliminating parasitic signals.

Turning to FIG. 9a, a source/sensor system 100 is shown disposed within the casing 10. The system 100 utilizes the mandrel 36 assembly of FIGS. 7a and 7b, with bow springs 46 affixed to the mandrel 36 body to centralize the mandrel 36 within the casing 10. In addition to direct deployment within the casing 10, the system 100 may be hung below tubing, deployed through tubing, or be integrated with tubing within the casing 10 (shown in FIGS. 11–12 and further described below). In any case, the system 100 may be removed from the casing 10 for maintenance or for upgrading sources/sensors or servicing electronics. Of course, for effective operation of the invention, the system 100 is disposed in the casing 10 so that the antenna or antennas 38 are positioned in alignment with a slotted casing station 12.

With the system 100 disposed in the casing 10, the EM waves generated by the antenna 38 couple to the slotted station 12 in the same way as to the shield 40. The azimuthal electric field component dominates the signal and induces a current on the inside of the casing 10, as shown in FIG. 9b. At each casing slot 14, the current flows around the edge to the outside and azimuthally closes the current loop on the outside of the casing 10 beyond the insulating structure 15. From there, the EM wave is radiated off into the surrounding formation as in an open-hole logging operation.

Inside the casing 10, the metal mandrel 36 and the casing 10 itself provide a low attenuation path for TM waves. TM waves have (mostly) radial electric fields and azimuthal magnetic fields, as indicated in FIGS. 10a and 10b. These TM waves can interfere with the resistivity measurement if no steps are taken to suppress their effects. In addition to centralizing the mandrel 36, the bow springs 46 also provide an electrical conductive path, providing a short between the mandrel 36 and the casing 10, which attenuates the TM waves. It will be appreciated by those skilled in the art that other centralizing and/or shorting structures may be used with the system 100. As described above, the antenna shields 40 also provide a degree of isolation against the TM waves.

TM waves can also be present on the outside of the casing 10 due to TE to TM conversion at dipping beds. As the steel in the casing 10 has a conductivity many orders of magnitude higher than any formation, such TM electrical currents can concentrate on the casing 10. However, the axial slots 14 in the casing 10 also function as an EM shield and do not permit TM fields on the outside of the casing 10 to penetrate inside the casing 10.

The source/sensor system 100 does not have to be immediately deployed when the well is completed. This equipment can be deployed months or years later, when there are significant changes in fluid saturations, as long as the tubular casing 10 is equipped with slotted stations 12. This greatly reduces the initial investment made by the oil company.

Another embodiment of a source/sensor system 110 is shown in FIG. 11, where the coil 38 is deployed on the exterior of a tubular 17 section, which allows the fluids to flow inside the tubular 17. The completion tubular 17 is run into the well after the casing 10 is cemented in place, and the coil 38 is positioned in alignment with the slot(s) 14 in the casing 10. The coil 38 is embedded in an insulating material and mounted on the tubular 17 outside diameter. The completion may also contain electronics, wireline connection to the surface, and other sensors (such as internal pressure or internal flow meters, not shown). An advantage of this design is that fluid flows inside the tubular 17, which may be replaced.

In a permanent monitoring installation, it may be advantageous to separately control the fluids produced from different regions of the well to optimize the overall well productivity. For example, if one region of the well is about to produce water, rather than oil, then that section of the well could be choked-back or even shut-in using a valve. Such valves can be located downhole from the surface as known in the art.

FIG. 12 shows an embodiment of a permanent monitoring installation 115 using a completion to control the fluids produced from different zones in the well. The tubular 17 section is attached to packer "A" to provide hydraulic isolation between the tubular 17 and the casing 10, and is anchored to the casing with slips. Fluids may be conveyed separately on the inside of this tubular 17, and in the annular space between the tubular 17 and the casing 10. There may also be smaller tubing strings ("A" and "B") inside the tubular 17. Tubing A, tubing B, and the tubular 17 are hydraulically isolated from each other by packer "B".

This completion isolates fluids flowing from different sections of the well. In this example, there are several regions of fluid flow. In the region just below the slotted station 12, perforations ("A") in the casing 10 allow fluids to enter the annular space between the casing 10 and the tubular 17. An opening 19 in the tubular then allows these fluids to flow inside the tubular, and then to enter a section of tubing A. The fluids flowing in tubing A can be separately controlled by a downhole valve or by a valve at the surface (not shown).

In a similar manner, tubing B may convey fluids from a lower section of casing 10. There may be a different set of perforations (not shown) which allows fluids to enter from a farther section of the well. The flow in tubing B may also be controlled separately by a valve (not shown). Above the slotted station 12, perforations "B" in the casing 10 allow fluids to enter the annular space between the tubular 17 and the casing 10. These fluids may be produced inside the tubular 17 to surface, or directed into another small tubular (not shown).

Hence, this complex completion allows fluids to be selectively produced in the wellbore. Mounting the antenna 38 on the exterior of the tubular 17 section positions the coil 38 close to the slot(s) 14 in the casing 10, and in a convenient location for the addition of packers, slips, valves, and multiple tubing strings.

4.3 Slot—Signal Interaction

The number of slots 14 and the dimensions of the slot 14 in the casing 10 affect how much TE signal passes through the slot 14, and therefore affects the overall efficiency of the measurement.

4.3.1 Axial Slot

Various factors affect the attenuation of the EM signal that passes through the station with the axial slot(s). These factors include the number of slots, the width of the slots, the length of the slots, the size and wall thickness of the casing, the casing material, and the frequency of the signal. Increasing the number, length and width of the slots generally increases the strength of the signal. For example, a casing with two slots on opposite sides has approximately half the attenuation of a one-slot configuration. However, the transmission is not significantly increased with more than approximately a dozen slots. For a fixed number, length, and width of slots, increasing the casing wall thickness and casing size has a slight effect on the signal. Hence, the techniques of the invention may be implemented with all casing sizes and in various configurations, including one long slot or long slotted-section.

Figure 13:
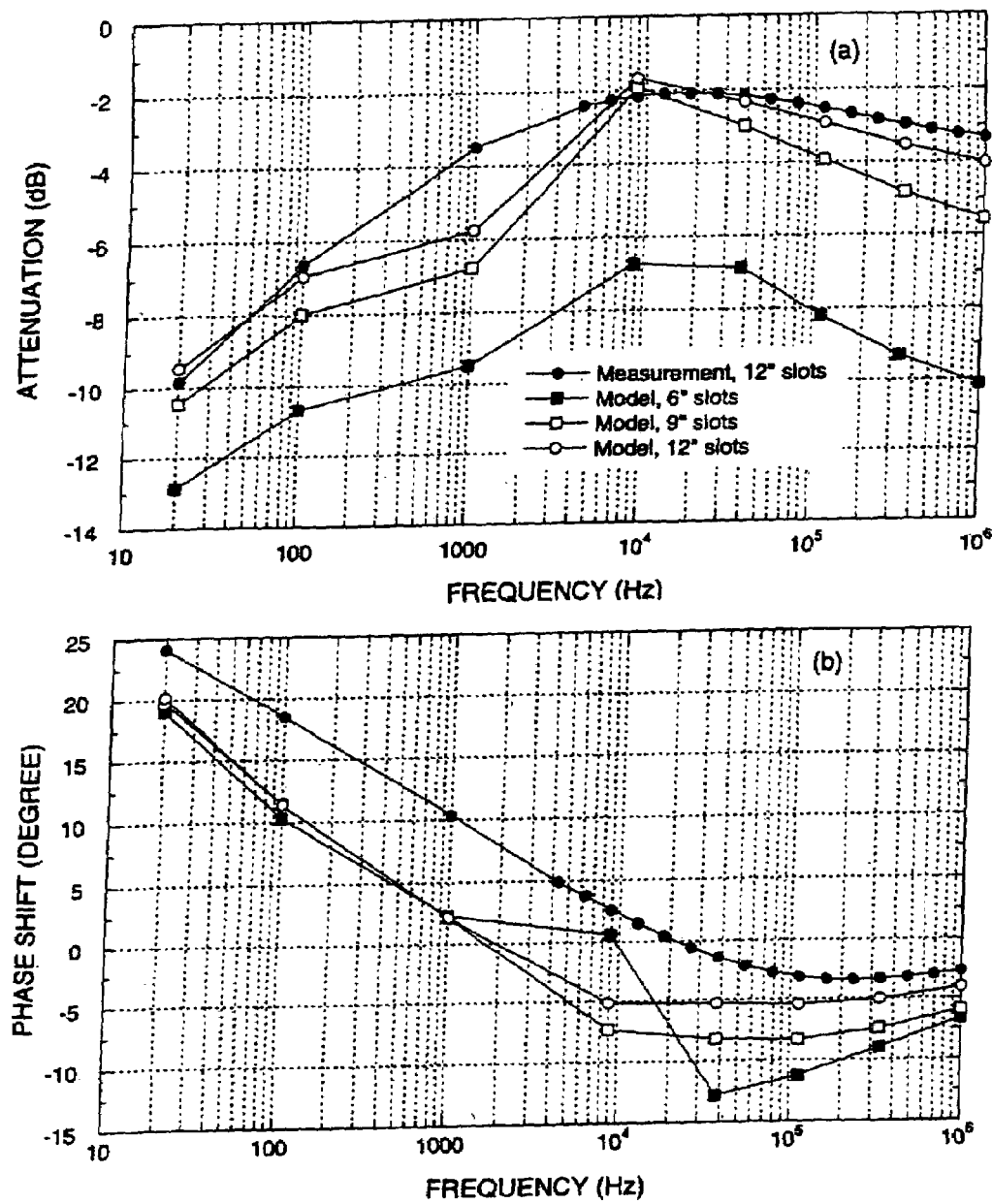
FIG. 13 illustrates graphically the experimentally and theoretically derived attenuation and phase shift of an electromagnetic signal transmitted through a slotted station in accord with the invention.

Experimental and theoretical results for the attenuation and phase shift of an EM signal are plotted in FIG. 13 for steel casing with an 8.375-inch outer diameter and a 0.5-inch wall. Three examples are plotted, one for 6 inch long slots, one for 9 inch long slots, and one for 12 inch long slots. In each example, there are 12 slots in the casing, each slot is 0.25 inches wide, and the slots are spaced at 30° intervals. Three curves are model data using a computer simulation of Maxwell's equations, and one curve contains experimental data (12-inch long slots). The EM signal is transmitted from a coil 3 inches long and 1.65 inches in diameter, containing 180 turns of AWG 26 wire. The reference for zero attenuation and zero phase shift is when there is no casing present.

The attenuations vary from 13 dB (6-inch long slots at 20 Hz) to 2 dB (9 and 12 inch long slots around 10 kHz). These attenuations are far less than when there are no slots present, particularly at frequencies greater than 1 kHz, where the attenuations are typically 90 dB or greater. Hence, there will be sufficient signal levels to perform a useful measurement.

The attenuations are reasonable over a very wide frequency range, from Hertz to Megahertz. The ability to operate over a wide frequency range is extremely useful to measure different depths into the formation, as described in section 4.5.

4.3.2 Non-Axial Slot

The previous discussion has focused on TE field waves generated by axial (non-tilted) coil antennas 38 and axial slots 14 in the casing 10. As seen in FIG. 9a, the orientation of the slots 14 is perpendicular to the electric field that is generated or detected by the coil 38. If the incident field has an unwanted component of the electric field that lies along the slot 14, then currents will flow in the metal casing 10 to cancel that field and only the normal component will remain. For conventional logging tools, the desired electric field is azimuthal. As described above, longitudinal slots 14 allow that field to pass.

Figure 14:
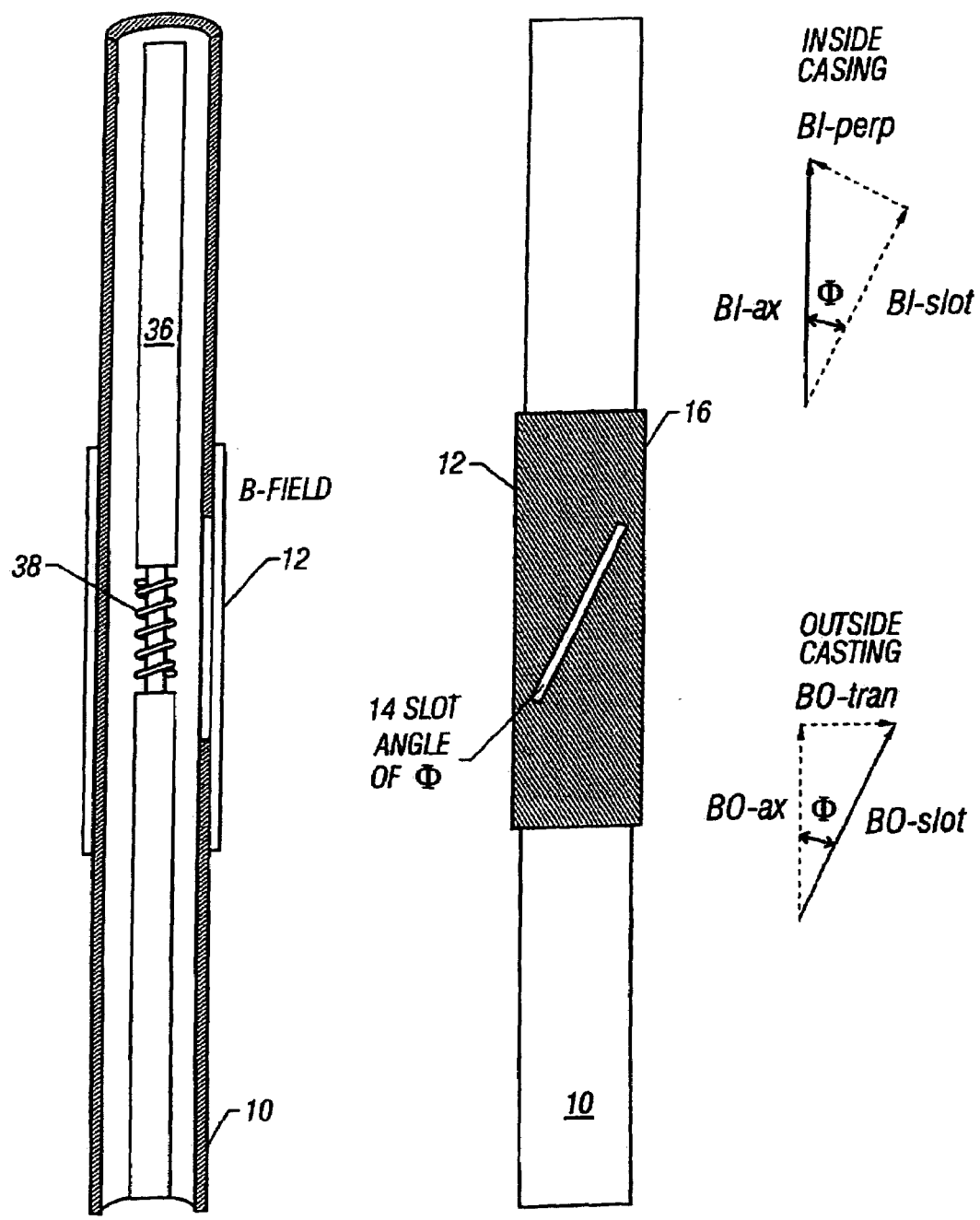
FIG. 14 is a schematic diagram of a sloped-slot station and a source/sensor system within the station in accord with the invention.

It is also possible to generate TM field waves with non-axial or tilted slots 14 in the casing 10. TM waves provide additional information that can be used to monitor the formation around the casing 10. For a given frequency and antenna 38 spacing, TM waves generally have shallower regions of investigation than TE waves. Turning to FIG. 14, another embodiment of the invention is shown.

The same coil antennas 38 used to generate TE waves can be used to generate TM waves as shown in FIG. 14. Inside the casing 10, the antenna 38 produces an axial magnetic field ("BI-ax"). This field can be expressed as the vector sum of a magnetic field parallel to the slot ("BI-slot") and a magnetic field perpendicular to the slot ("BI-perp"). If the angle between the slot 14 and the casing 10 axis is $\Phi$, then BI-slot=BI-ax cos ($\Phi$). This component is slightly attenuated by the slot 14, but produces an external magnetic field BO-slot=$\alpha$BI-slot, where $\alpha$ is the scaling factor. This external field can be decomposed into external magnetic fields parallel to the casing 10 axis ("BO-ax") and transverse to it ("BO-tran"), where BO-ax=BO-slot cos ($\Phi$) and BO-tran=BO-slot sin ($\Phi$). Hence:

$$BO\text{-}tran = \alpha/2\ BI\text{-}ax\ \sin(2\Phi) \text{ and } BO\text{-}ax = \alpha BI\text{-}ax\ \cos^2(\Phi) \quad (1)$$

The transverse magnetic field is maximum at $\Phi=45°$, and zero at $\Phi=0°$ and $90°$. The axial magnetic field is maximum at $\Phi=0°$ and $90°$ (as expected). The two components are equal at $\Phi=45°$.

The axial magnetic field produces TE radiation, while the transverse magnetic field produces TM radiation. A slotted station 12 to let pass the desired TM-field wave, and attenuate the undesired components, should have at least one sloped slot 14 that is sloped at an angle $\Phi$ with respect to the casing 10 axis. If there are multiple slots 14 at the same angle $\Phi$, then the axial components sum to an effective vertical magnetic dipole, and the transverse components sum to an azimuthal magnetic source equivalent to a vertical electric dipole.

While both TE and TM radiation are present, TM radiation will generally be guided along the casing 10 and be less attenuated than the TE radiation, resulting in a larger signal at a receiver antenna 38 within a sloped-slot station 12. Thus, by aligning an axial antenna 38 within a sloped-slot station 12 of the invention, TM field waves can be produced. The invention is also effective with the coils 38 disposed within the casing 10 at an angle with respect to the casing 10 axis.

The slotted station 12 or the coil 38 may be constructed to alter the tilt angle of the magnetic dipole with respect to the axial direction. Combinations of sloped and axial slots 14 of varying length, orientation, symmetry, and spacing, may be formed on the casing 10 wall. The sloped slots 14 may have equal or varied slope angles with respect to the casing 10. The slots 14 may also be cut in a curved pattern (instead of straight) within the casing 10 wall. The spacing between the coil antenna 38 and the inside diameter of the casing 10 may also be varied. It will be appreciated by those skilled in the art having the benefit of this disclosure that other modifications may be employed to increase the efficiency of the slotted station 12.

4.4 Electronics

Figure 15:
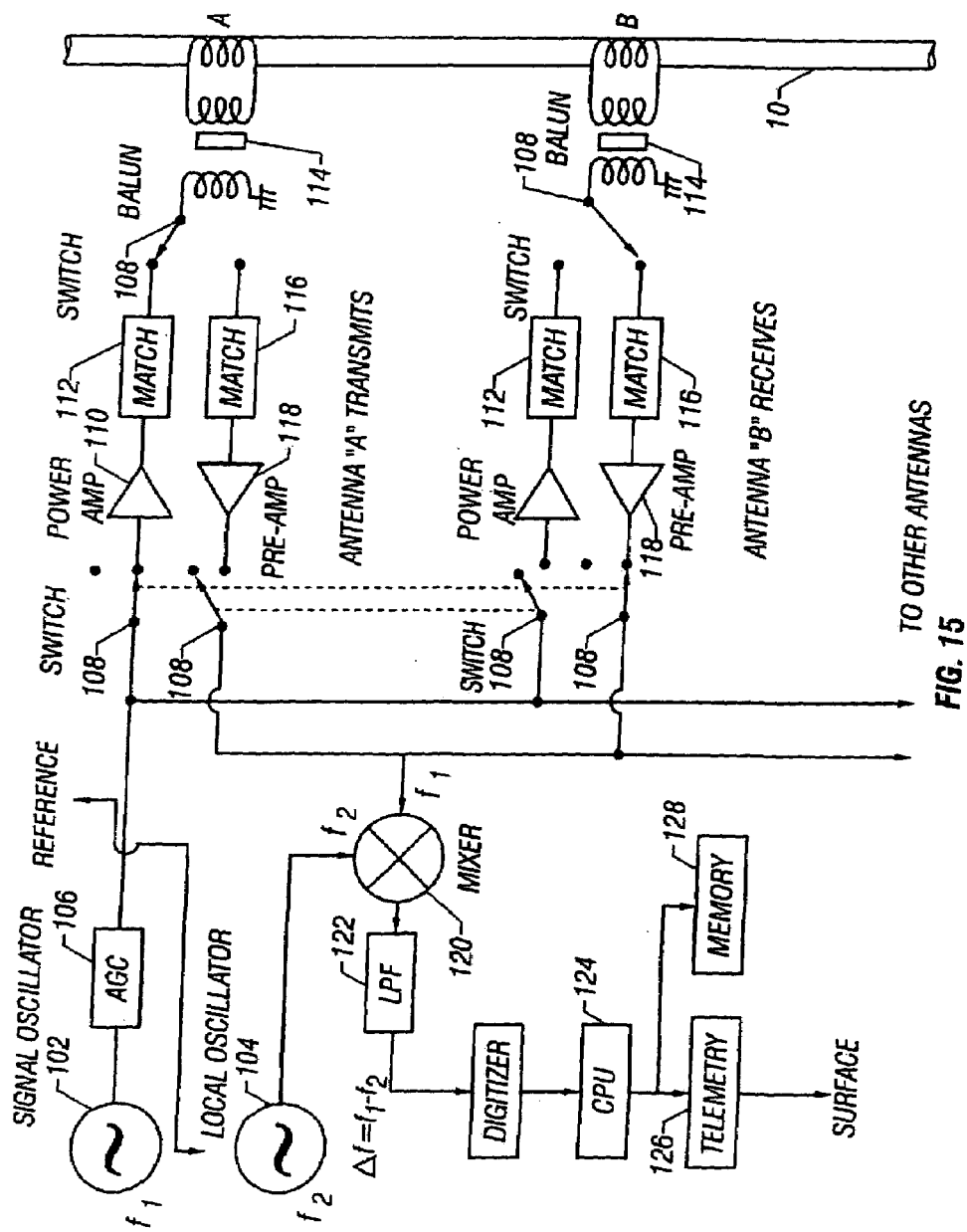
FIG. 15 is a block diagram of the electronics utilized with the source/sensor systems of the invention.

FIG. 15 is a block diagram of the electronics that may be used to operate the source/sensor embodiments of the invention. A signal oscillator 102 (frequency f1) and a local oscillator 104 (frequency f2) are frequency locked to each other. The signal oscillator 102 has an automatic gain control circuit 106 that keeps the signal in a receiver in a useable range. A reference signal is used to obtain the phase and amplitude of the f1 signal oscillator 102. The f1 signal is applied to an antenna (e.g., antenna A) via switches 108, power amplifier 110, impedance matching circuit 112, and a balun transformer 114. The electromotive-force output by antenna B drives a balun transformer 114, a matching network 116, and a pre-amplifier 118. The received signal f1 is switched into a mixer 120. The mixer 120 outputs an intermediate frequency ("IF") signal at $\Delta f=f1-f2$ which preserves the phase and amplitude information of the signal at f1. A low pass filter 122 allows $\Delta f$ to pass, but blocks the other frequency components (f1, f2, 2×f1, etc.). The IF signal is digitized, and the phase and amplitude of the digitized signal are calculated in the CPU 124. The measured phase and amplitude are sent uphole via a telemetry system 126 and/or stored in memory 128. In operation, the other antennas in the system may be disconnected from the lines during the time antenna A is broadcasting and antenna B is receiving. Alternatively, two or more antennas may be simultaneously receiving while any one antenna is broadcasting.

It will be understood that the following embodiments of the invention incorporate the elements of the invention described above.

4.5 Well Completions and Measurement Schemes

Figure 16:
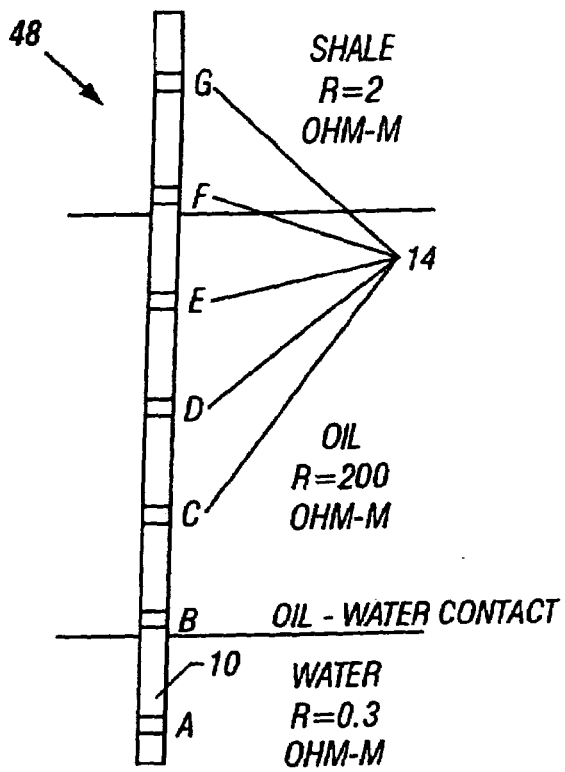
FIG. 16 is a schematic diagram of a well completed with a slotted tubular in accord with the invention.

FIG. 16 shows a vertical well 48 completed through an oil zone with a slotted tubular 10 and source/sensor system (not shown) of the invention. The slotted stations 14 (labeled "A–G") are located at regular intervals in and near the oil zone. The through-casing resistivity measurements of the invention are based on measuring the phase, amplitude, phase shift, and/or attenuation of a TE polarized EM wave as described above and in U.S. Pat. No. 4,899,112 (assigned to the present assignee).

The frequency of the transmitted signal f1 (see FIG. 15) is chosen for optimum sensitivity to the formation properties, reasonable signal to noise performance, and to provide appropriate depths of investigation. The upper frequency limit is determined by the minimum signal to noise ratio for a given transmitter to receiver antenna spacing along the tubular 10. The lower frequency limit is determined by the minimum measurable phase and amplitude changes. High frequencies (typically hundreds of kilohertz to a few megahertz) are sensitive to formation properties near the wellbore, while low frequencies (typically of hundreds of hertz to tens of kilohertz) can be sensitive to formation properties several meters away from the wellbore. Even lower frequencies can be used for cross-well measurements.

Figure 17:
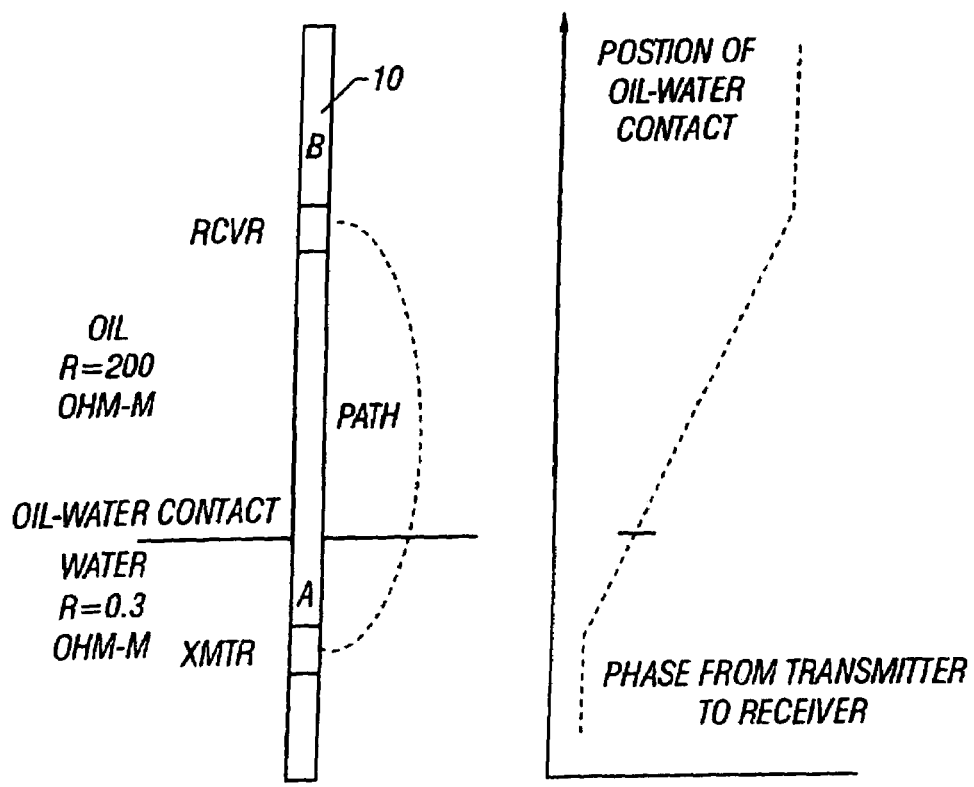
FIG. 17 is a schematic diagram of a two-antenna-source/sensor system in accord with the invention.

FIG. 17 shows an embodiment of the invention illustrating a simple casing 10 system that involves measuring the phase of an EM signal transmitted between a transmitter antenna A and a receiver antenna B. As the position of the oil-water contact rises, the phase at the receiver B increases. With the resistivities of the water and oil zones known and stored from openhole logs, one can construct a theoretical model to relate the change in phase to the change in fluids. Additionally, the signal amplitude will decrease as the oil-water contact rises, which could also be used to monitor changes in the oil-water contact.

Figure 18:
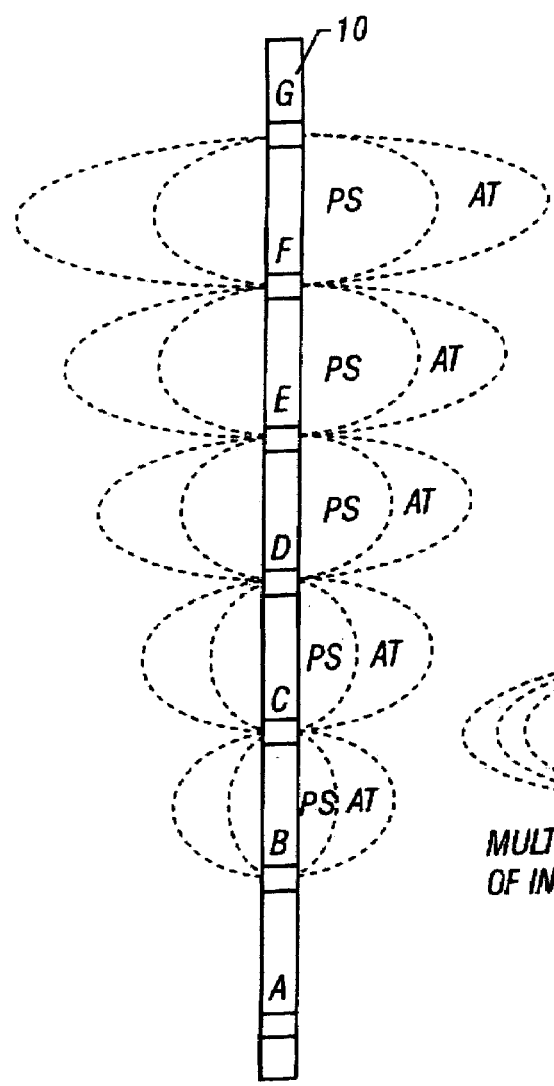
FIG. 18 is a schematic diagram of a slotted tubular segment containing multiple antennas to provide for various distributed measurements between the antennas in accord with the invention.

FIG. 18 shows another embodiment of the invention. More sophisticated measurements can be made when several antennas (labeled "A" to "G") are installed in the tubular 10. First, the phase shift and the attenuation measured between pairs of receiver antennas are far more sensitive to formation properties than the signal phase or amplitude at a single receiver antenna.

Referring to the seven antennas (A–G) in FIG. 18, suppose antenna A is the transmitter, and the other antennas are receivers. The phase shift ("PS") and attenuation ("AT") can be measured between adjacent antenna pairs BC, CD, DE, EF, and FG. This provides five phase shift measurements and five attenuation measurements. The phase shift measurement provides a shallower depth of investigation than the attenuation measurement for a given transmitter to receiver pair spacing (illustrated by the elliptical areas in FIG. 18). Increasing the spacing between the transmitter and the receiver pair increases the depth of investigation. The phase shift and attenuation may also be measured between non-adjacent receivers.

Figure 19:
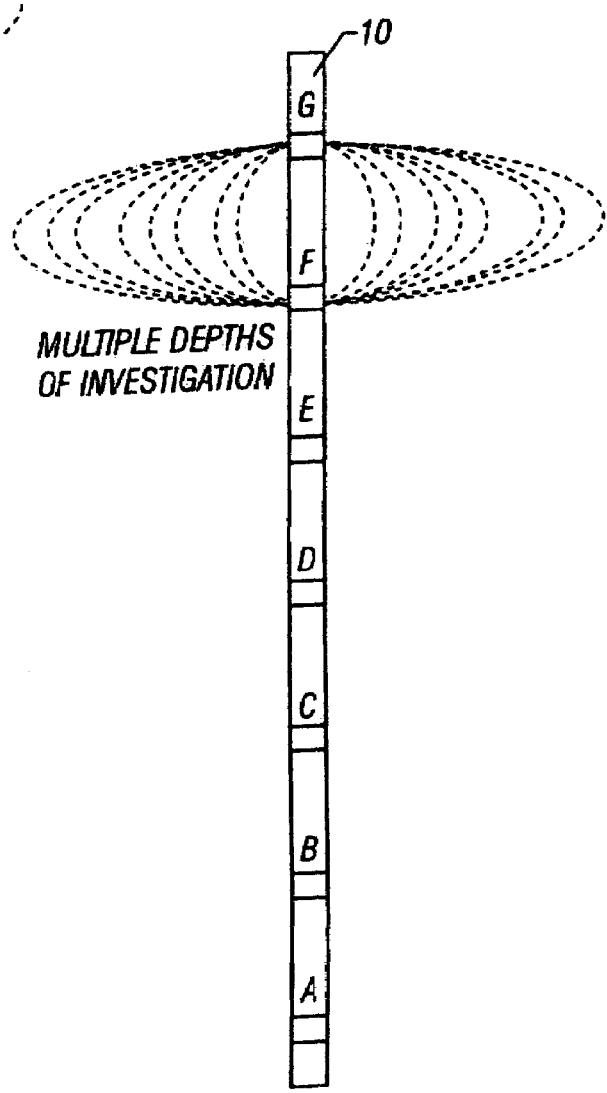
FIG. 19 is a schematic diagram of a measurement scheme using the slotted tubular segment of FIG. 18 in accord with the invention.

Turning to FIG. 19, if antennas A, B, C, D and E (of FIG. 18) are used sequentially as transmitters, and antennas F and G are receivers, then five phase shift measurements and five attenuation measurements are obtained, which provide ten depths of investigation. Thus, one can infer resistivity as a function of radial distance from the tubular 10. With different antennas as receivers, one can also measure the variation in resistivity along the tubular 10.

4.5.1 Borehole Compensation

The accuracy of phase shift and attenuation measurements are significantly improved with borehole compensation ("BHC"), which can be obtained for any antennas except for the first and last ones on the completion. Referring to FIG. 18, receiver pairs BC, CD, DE, and EF can be borehole compensated, but not AB or FG. The aim of BHC in this configuration is to eliminate phase and amplitude differences among the antennas and among the slotted stations in the tubular 10.

Consider the receiver pair consisting of antennas B and C, and the transmitter pair consisting of antennas A and D. The BHC phase shift is $$PS_{BHC}=(PS(A,BC)+PS(D,BC))/2 \quad (2)$$

and the BHC attenuation is $$AT_{BHC}=(AT(A,BC)+AT(D,BC))/2, \quad (3)$$

where PS(A,BC) represents the phase shift between antennas B and C with A transmitting, and where AT(A,BC) represents the attenuation. It is understood that the sign convention for the individual phase shifts and attenuations are chosen so that the upward and downward phase shifts have the same signs, and similarly for the attenuations. The resulting quantities, $PS_{BHC}$ and $AT_{BHC}$, are insensitive to any differences between the antennas B and C, or the differences between the slotted stations over B and C.

The phase shift imbalance is $$PS_{IMB}(AD,BC)=(PS(A,BC)-PS(D,BC))/2 \quad (4)$$

and the attenuation imbalance is $$AT_{IMB}(AD,BC)=(AT(A,BC)-AT(D,BC))/2. \quad (5)$$

These imbalances can be used to eliminate antenna and slotted station differences for receiver pair BC when antennas E, F, or G are transmitting. The pseudo-BHC phase shift when E is transmitting is $$PS_{PBHC}(E,BC)=PS(E,BC)-PS_{IMB}(AD,BC) \quad (6)$$

and the pseudo-borehole compensated attenuation is $$AT_{PBHC}(E,BC)=AT(E,BC)-AT_{IMB}(AD,BC). \quad (7)$$

This approach effectively removes all antenna to antenna and slotted-station to slotted-station variations, thus providing cleaner data for measuring the resistivity of the reservoir formations.

4.5.2 Vertical Wells

Figure 20A:
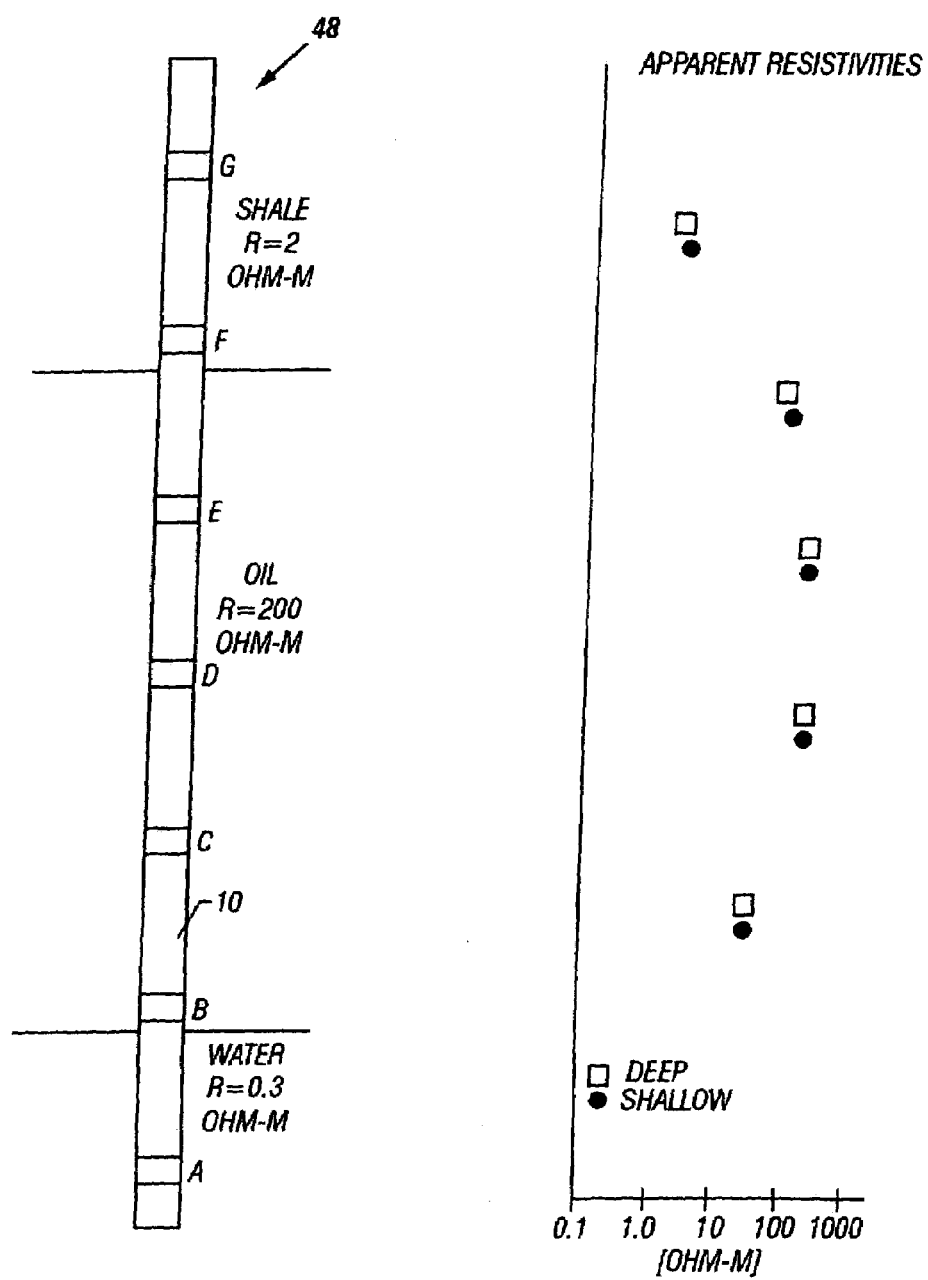
FIGS. 20a–20c are schematic diagrams of wells completed with the slotted tubulars of the invention showing the phase shift and attenuation measurements obtained for various oil-water contact points.
Figure 20B:
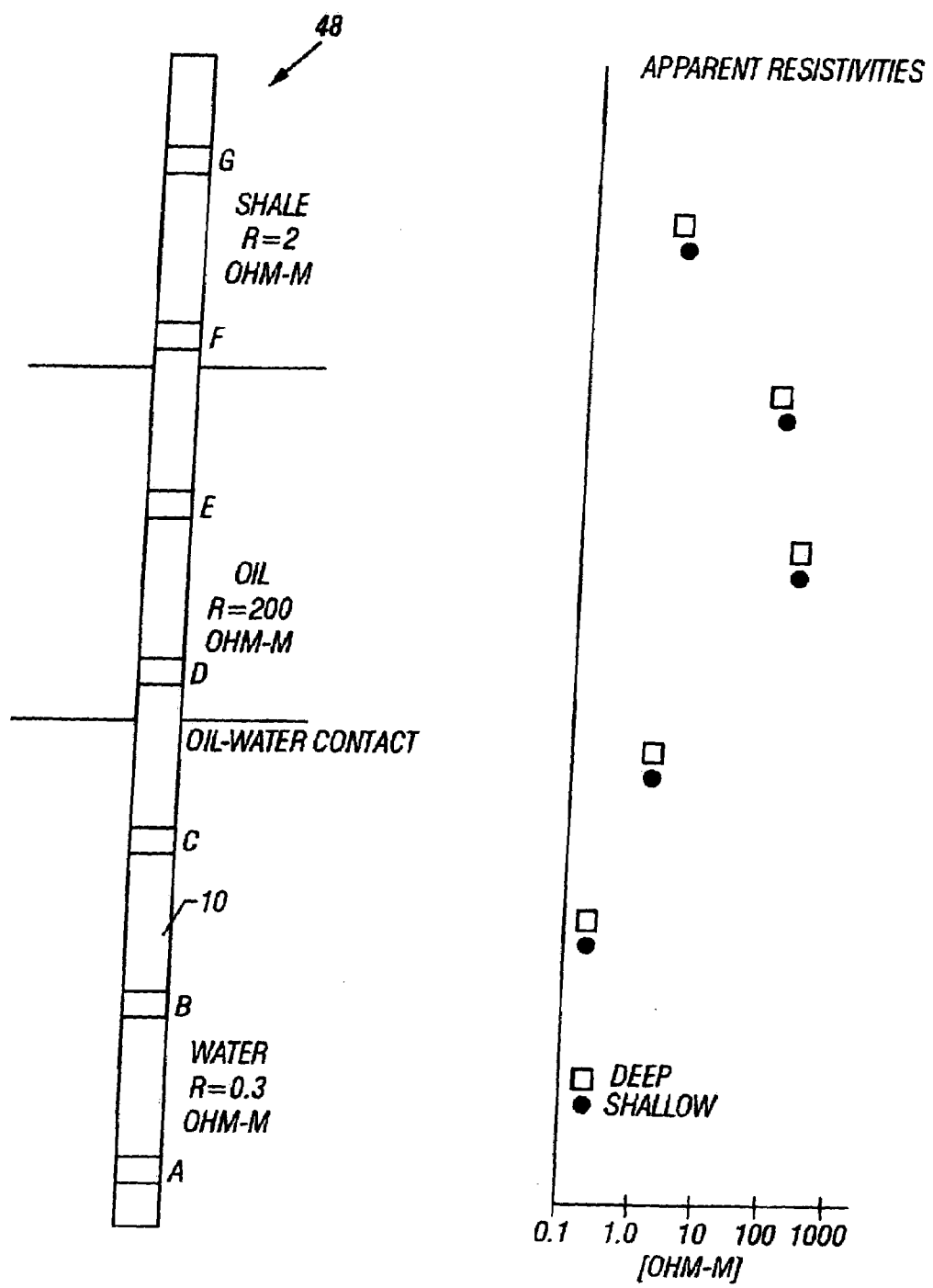
Figure 20C:
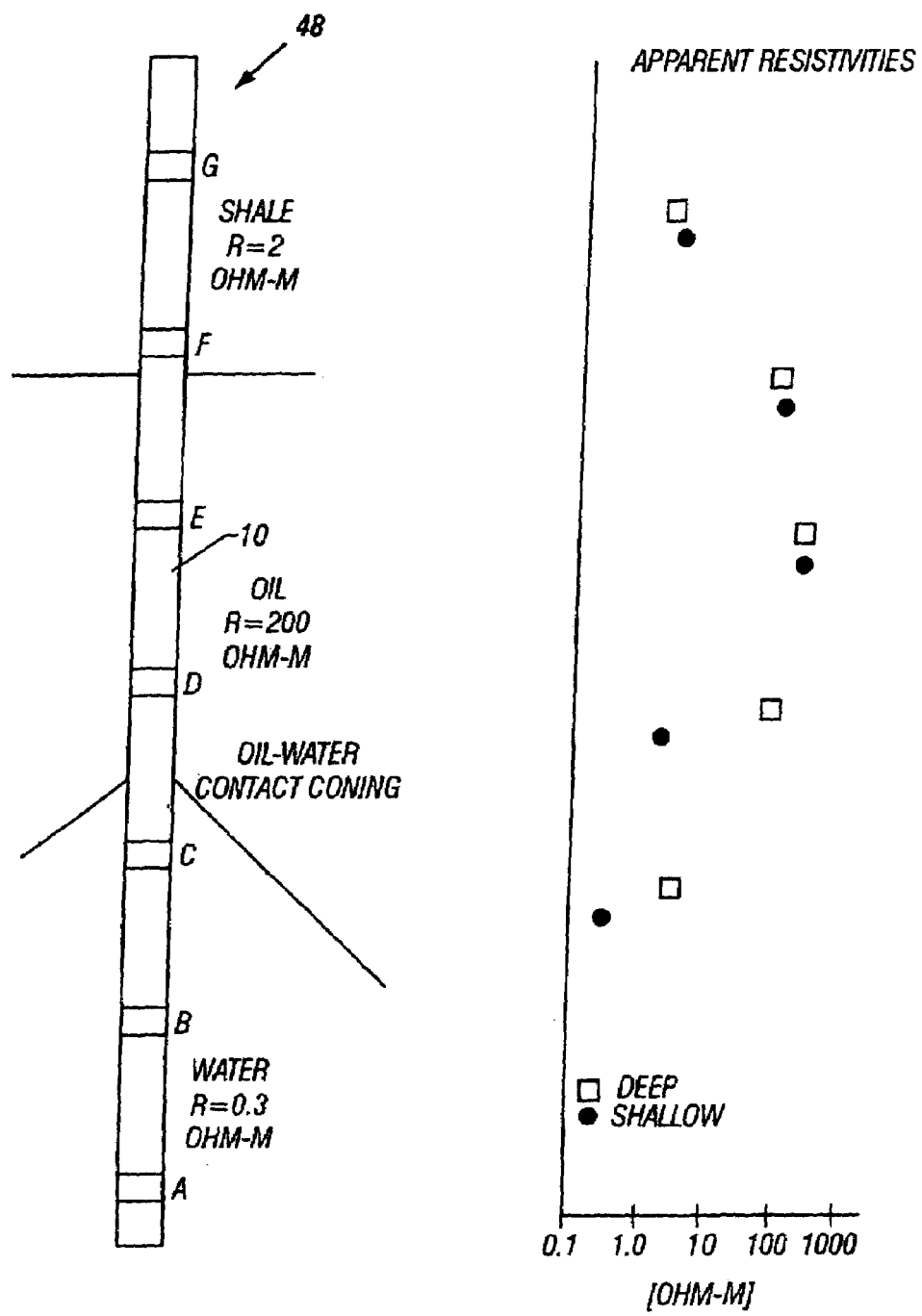

FIGS. 20a–20c show a vertical well 48 equipped with an embodiment of the invention. As seen in the figures, there is an upper shale bed with resistivity of 2 ohm-m, an oil sand with resistivity of 200 ohm-m, and water sand with a resistivity of 0.3 ohm-m. Initially, the oil-water contact is just below antenna B as shown in FIG. 20a. A large phase shift and high attenuation are measured between receiver pair AB because of the low resistivity of the water sand. For convenience, phase shifts and attenuations are converted to apparent resistivities (as known in the art and described in U.S. Pat. No. 4,899,112, assigned to the present assignee) and plotted to the right of FIGS. 20a–20c. The square symbol represents the deepest measurement, and the circular symbol represents the shallowest measurement. Because there is no radial variation in the formation, the shallow and deep resistivities read the same values for any pair of receivers.

FIG. 20b assumes that the oil-water contact is between antennas C and D after the well 48 has been on production. The apparent resistivities measured with receiver pair BC indicate that the region between B and C is water saturated, while the apparent resistivities measured by the receiver pair DE indicate that the corresponding region is still oil saturated. The apparent resistivities measured with receiver pair CD are intermediate to the water sand and the oil sand, indicating that the oil water contact lies between antennas C and D. From a forward model for the formation, it is possible to more precisely locate the position of the oil-water contact.

FIG. 20c assumes that the oil-water contact forms a cone instead of a planar interface. In this case, the deeper-reading, apparent resistivities will have a higher resistivity that the shallower-reading resistivities for the receiver pairs BC, and CD. From this, one can deduce the presence of water coning. Again, forward modeling can refine the position of the oil-water contact and the extent of the water cone.

4.5.3 Horizontal Wells

Figure 21:
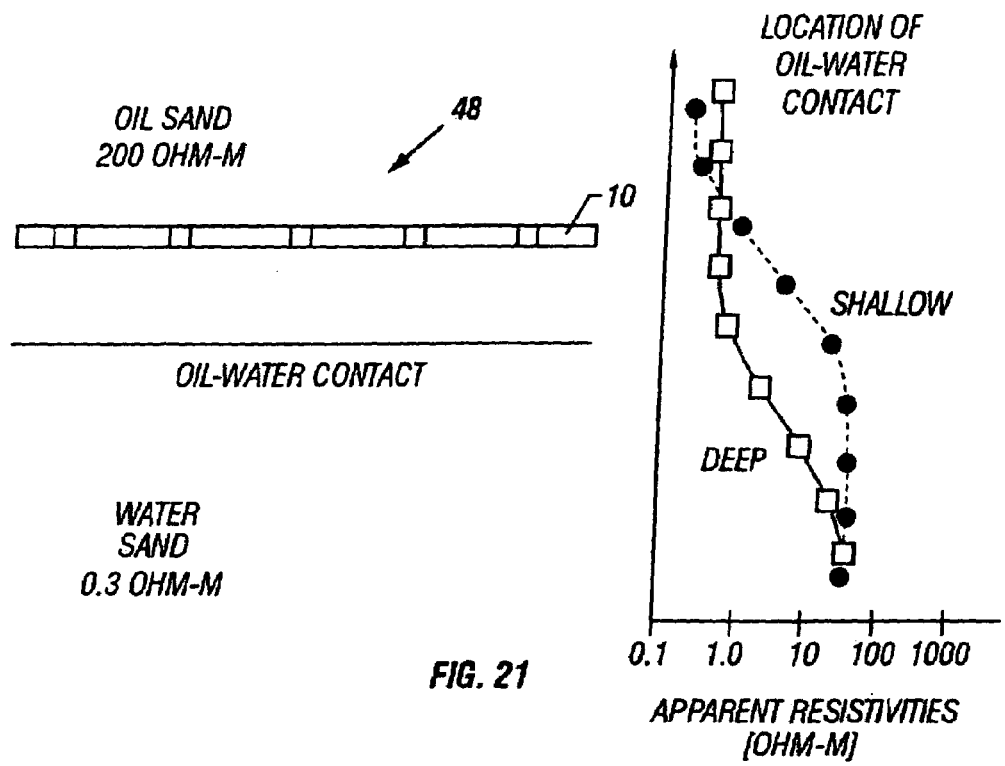
FIG. 21 is a schematic diagram of the slotted tubular of the invention applied to a horizontal well.

The above technique may be applied to a horizontal well 48 as shown in the embodiment of FIG. 21. Assume the horizontal well is in a 200 ohm-m oil sand above a water zone with 0.3 ohm-m resistivity. When the oil-water contact is far below the well, both the shallow and deep resistivities read 200 ohm-m. As the oil-water contact rises, the deep reading resistivity senses the change first and reads a lower value. The shallow reading resistivity remains near 200 ohm-m until the oil-water contact is close to the tubular 10. Then, the shallow resistivity rapidly decreases. By comparing the shallow and deep resistivities, the location of the oil-water contact can be determined well before it reaches the wellbore. If the flow from different regions is controlled with valves, then the region about to produce water can be choked-back.

4.5.4 Cross-Well Monitoring

Figure 22:
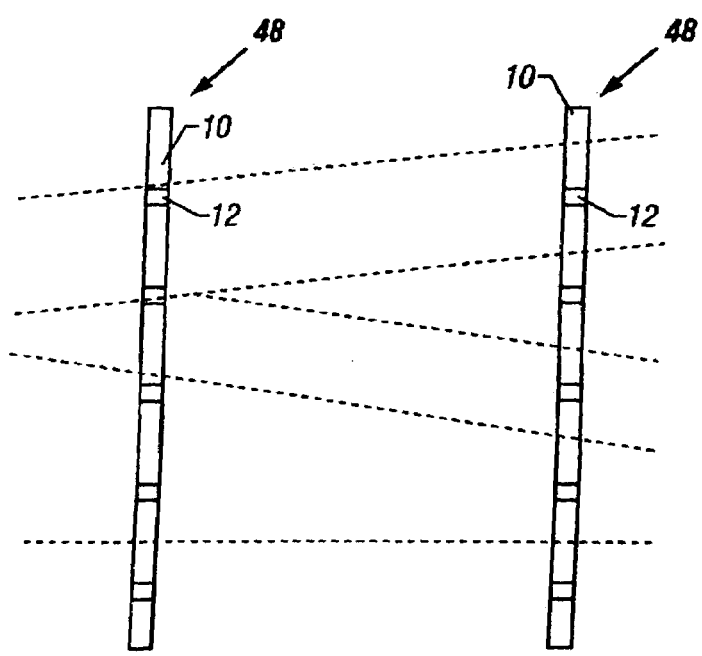
FIG. 22 is a schematic diagram of a cross-well monitoring scheme utilizing the slotted tubulars in accord with the invention.

FIG. 22 shows another embodiment of the invention. Two adjacent wells 48 may be used for cross-well monitoring if they contain arrays of slotted stations 12. In this configuration, the frequency used is quite low (tens of hertz to kilohertz) because the inter-well spacing can be large. The principle of the measurement (axial magnetic field) inside the completion remains the same as described above. One of several inversion methodologies may be used to infer saturation changes with time as known in the art.

Other embodiments of the invention may include a cased well equipped with slotted stations 12 and source/sensor systems in communication with an open hole, the surface, or another tubular disposed in a second borehole (not shown). Such configurations provide for asymmetric measurements (i.e., open-hole-cased-hole or surface-cased-hole) in both directions: source in the cased hole and sensors in the open hole or at the surface and vice versa.

4.5.5 Well Logging

Figure 23:
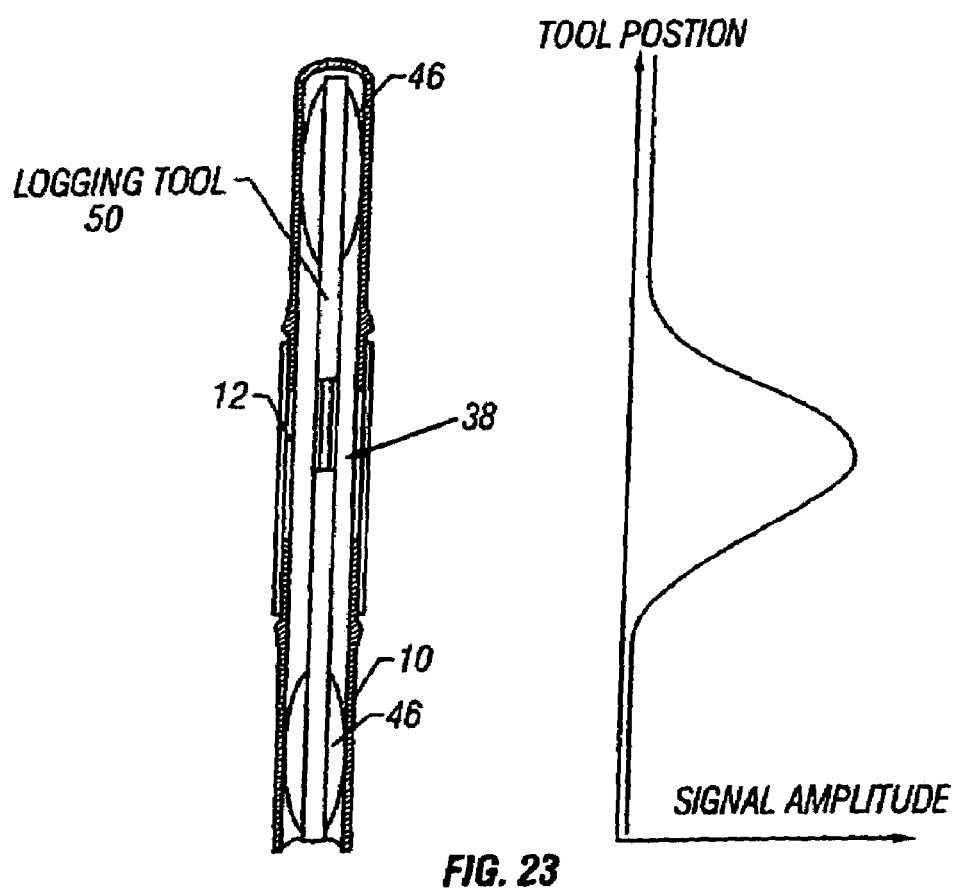
FIG. 23 is a schematic diagram of a logging tool configuration within the slotted casing in accord with the invention.

FIG. 23 shows another embodiment of the invention. An alternative to permanent monitoring is periodic well logging using a small diameter wireline tool 50 (e.g., 1 11/16 inch) as known in the art. The casing 10 contains slotted stations 12 in and near the regions of interest. The slotted stations 12 are preferably equally spaced, and the spacing matches the antenna 38 spacing on the tool 50. Otherwise, the tool 50 is similar to the source/sensor systems described above. Bow spring centralizers 46 keep the tool 50 centered within the casing 10 and provide a short circuit for unwanted TM fields.

As the tool 50 is moved through the well, the signal amplitude will vary as the antennas 38 pass by the slotted stations 12. The signal amplitude will be maximum when the antennas 38 are aligned with a slotted station 12, and will be minimum when the antennas 38 are distant from the slotted station 12. The die-off distance is approximately the length of the slot 14. Thus, monitoring the signal amplitude indicates when the antennas 38 are precisely aligned with the slotted stations 12, and the phase and amplitude or phase shift and attenuation at this instant may be used for the resistivity measurement. This approach may also be used to position the string for permanent monitoring.

Figure 24:
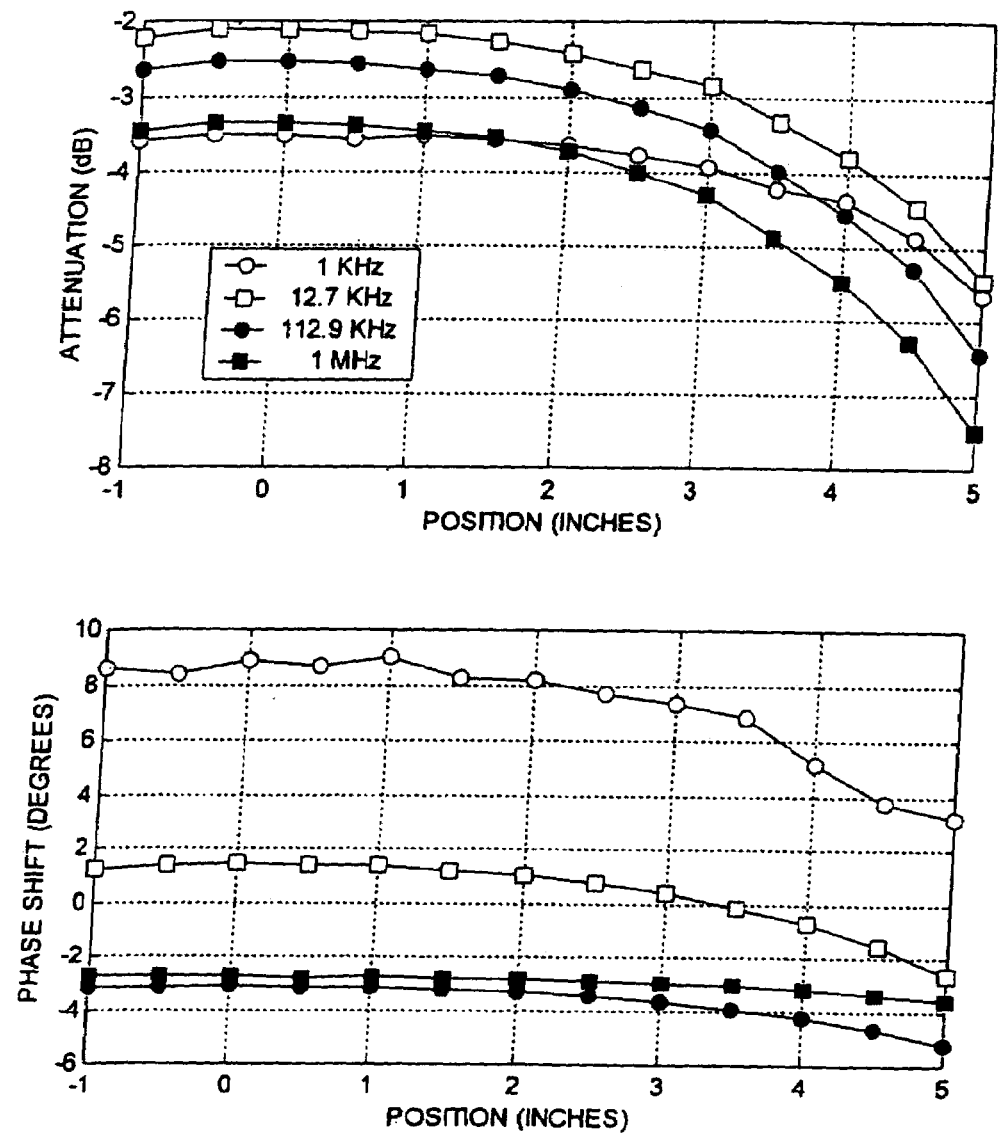
FIG. 24 illustrates graphically the experimentally derived attenuation and phase shift of an electromagnetic signal transmitted through a slotted station as a function of vertical position of the source within the tubular in accord with the invention.
Figure 25:
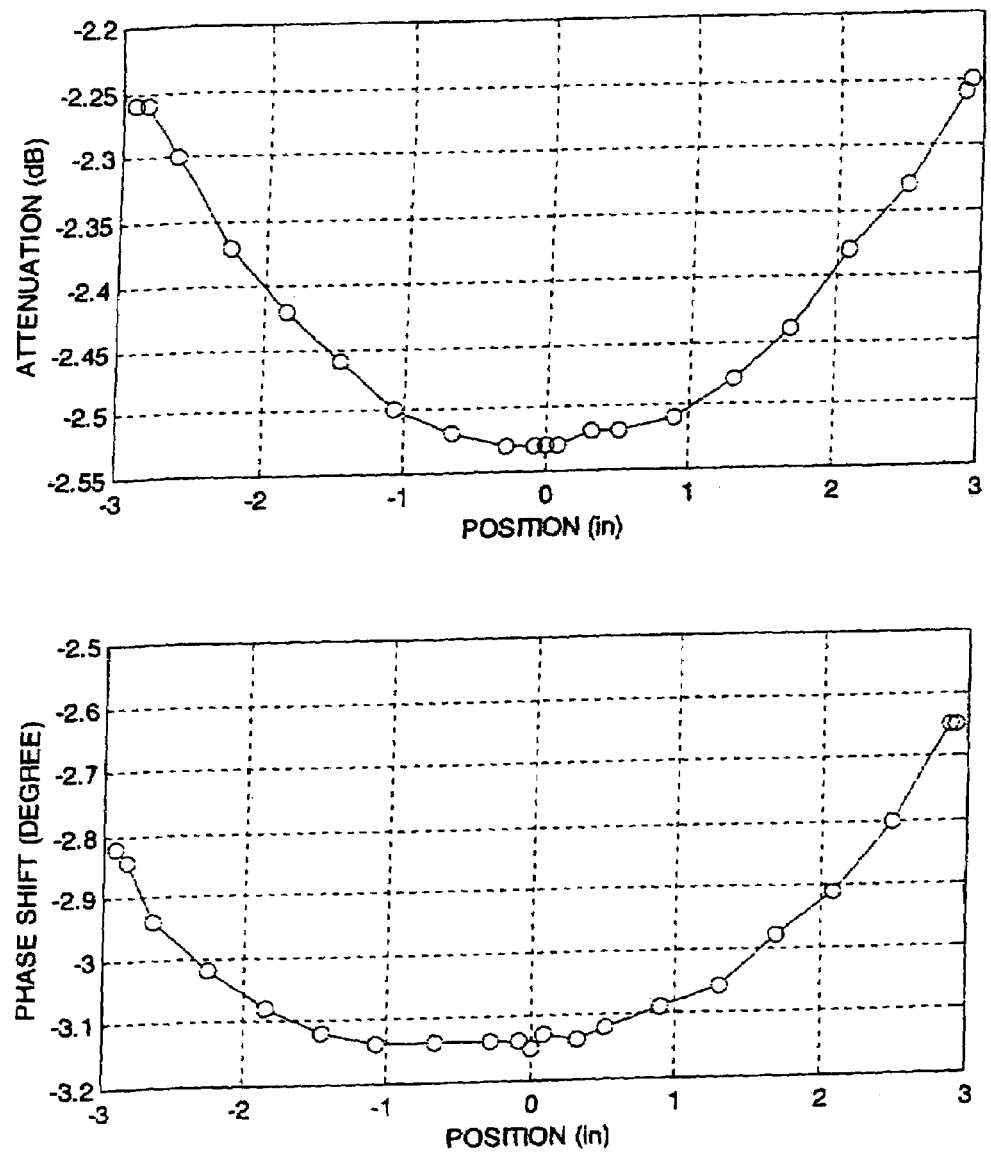
FIG. 25 illustrates graphically the experimentally derived attenuation and phase shift of the electromagnetic signal of FIG. 24 with an eccentered source within the tubular in accord with the invention.

FIG. 24 shows the effect of axial displacement for a 3 inch long by 1.65-inch diameter coil with 180 turns in an 8.375-inch OD casing. There are 12 axial slots in the casing; each slot is 0.25 inches in width and 12 inches long. The attenuation and phase shift do not vary significantly over the length of the slot. FIG. 25 shows the effect of eccentering the coil inside the same casing, which might occur for a poorly centralized tool. The attenuation and phase shift versus eccentricity are not significantly degraded.

Borehole compensation, as explained in section 4.5.1, removes any systematic errors caused by axial displacement or eccentricity.

With this configuration, periodic well logging could be performed early during production, and when time-lapse logging reveals changes, a permanent monitoring system could be deployed. This would provide stages of investment: stage 1—run completion with slotted stations 12, stage 2—perform periodic production logging, stage 3—place a permanent monitoring string. Being able to install the permanent monitoring string without pulling the tubing would be a major advantage. Therefore it is advantageous to use a small diameter well logging tool or permanent monitoring tool which can pass through the ID of a tubing string.

4.5.6 Slotted-Liner

Figure 26:
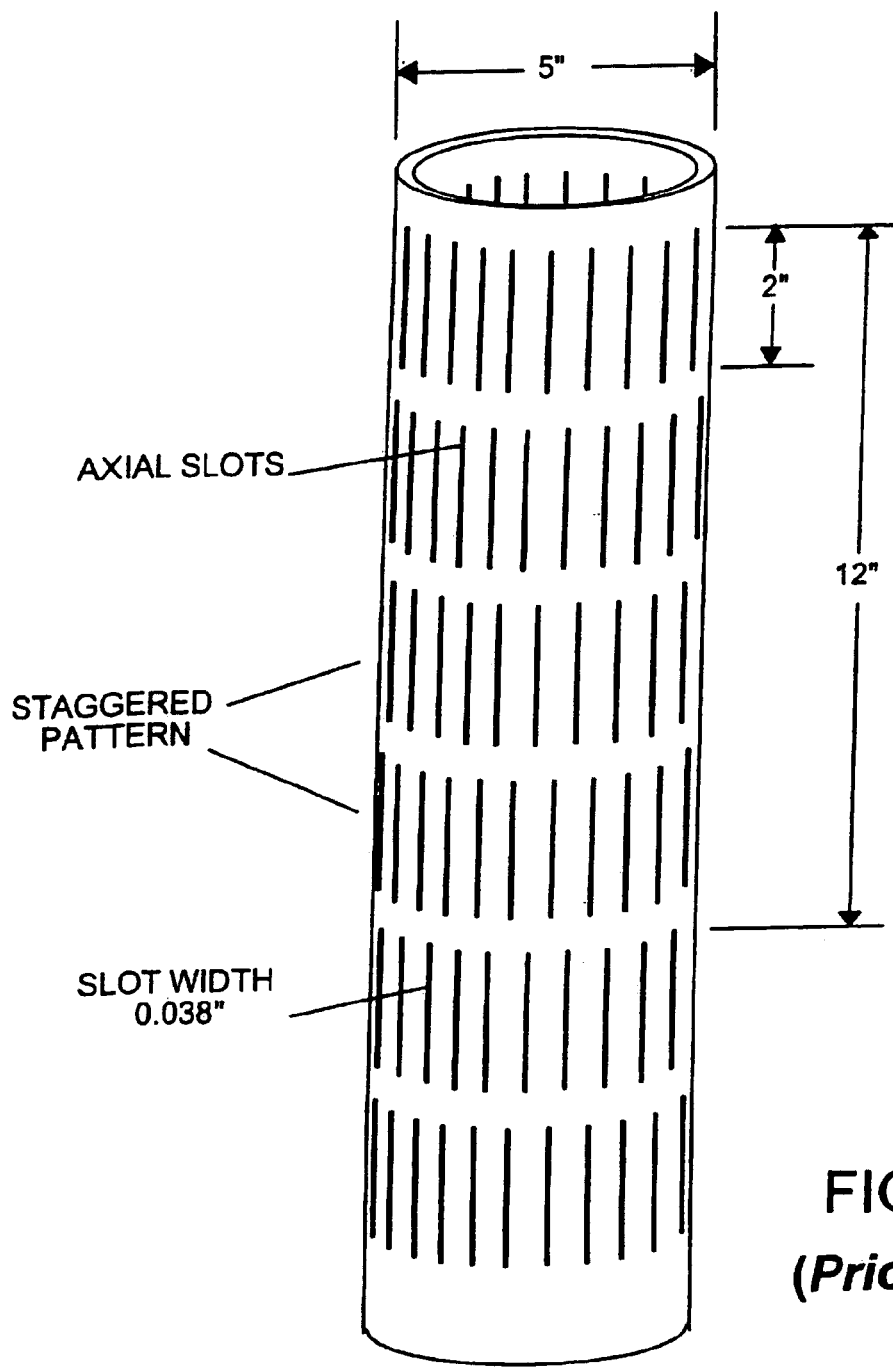
FIG. 26 is a schematic diagram of a conventional slotted liner.

As described above, tubular slotted-liners are used to buttress wellbores that are susceptible to collapsing. The tubulars are run into the wellbore to prevent the formation from collapsing and blocking-off the wellbore. These types of liners typically have a large number of narrow slots per unit length. The width of the slot is often chosen to be slightly smaller than the size of a sand grain in the producing formation (typically 0.01 to 0.05 inches). In common practice, the slot length is usually about 2 inches, and the number of slots per foot is chosen to provide about 3% to 5% open area in the liner wall. For example, a 5 inch diameter slotted liner having 80 slots per foot with each slot being 0.038 inches wide by 2 inches long, provides 3.2% open area, as shown in FIG. 26. There are 20 axial slots per set, and four sets per foot.

Figure 27:
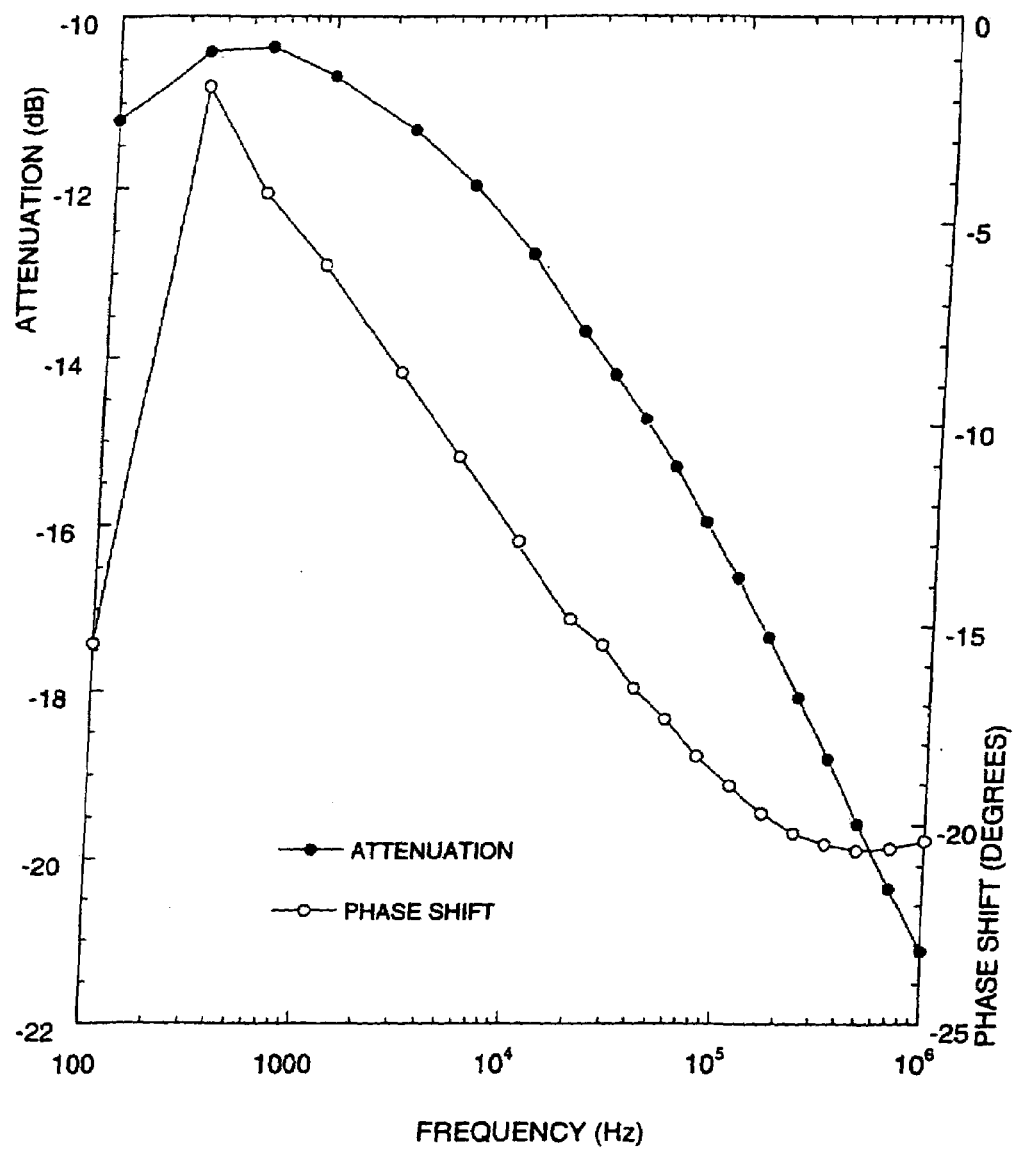
FIG. 27 illustrates graphically the experimentally derived attenuation and phase shift of an electromagnetic signal transmitted through the slotted liner of FIG. 26 as a function of source frequency in accord with the invention.

An embodiment of the invention uses the described source/sensor implementations disposed inside of a slotted-liner (not shown) for measuring the characteristics of the surrounding formations. FIG. 27 shows the attenuation and phase shift of an electromagnetic signal passing through a slotted-liner of the above dimensions, as a function of frequency. The signal is generated by a 3 inch long by 1.65-inch diameter coil consisting of 180 turns of AWG 26 wire. Since there are a large number of slots per unit length, it is not necessary to position the sensors precisely within the slotted-liner. The slotted-liner may also include a long zone of short slots that axially overlap and are azimuthally staggered (not shown). The source/sensor system may be permanently deployed in the slotted-liner, or may be run as a wireline logging service.

4.5.7 Downhole Slot-Cutting

Figure 28:
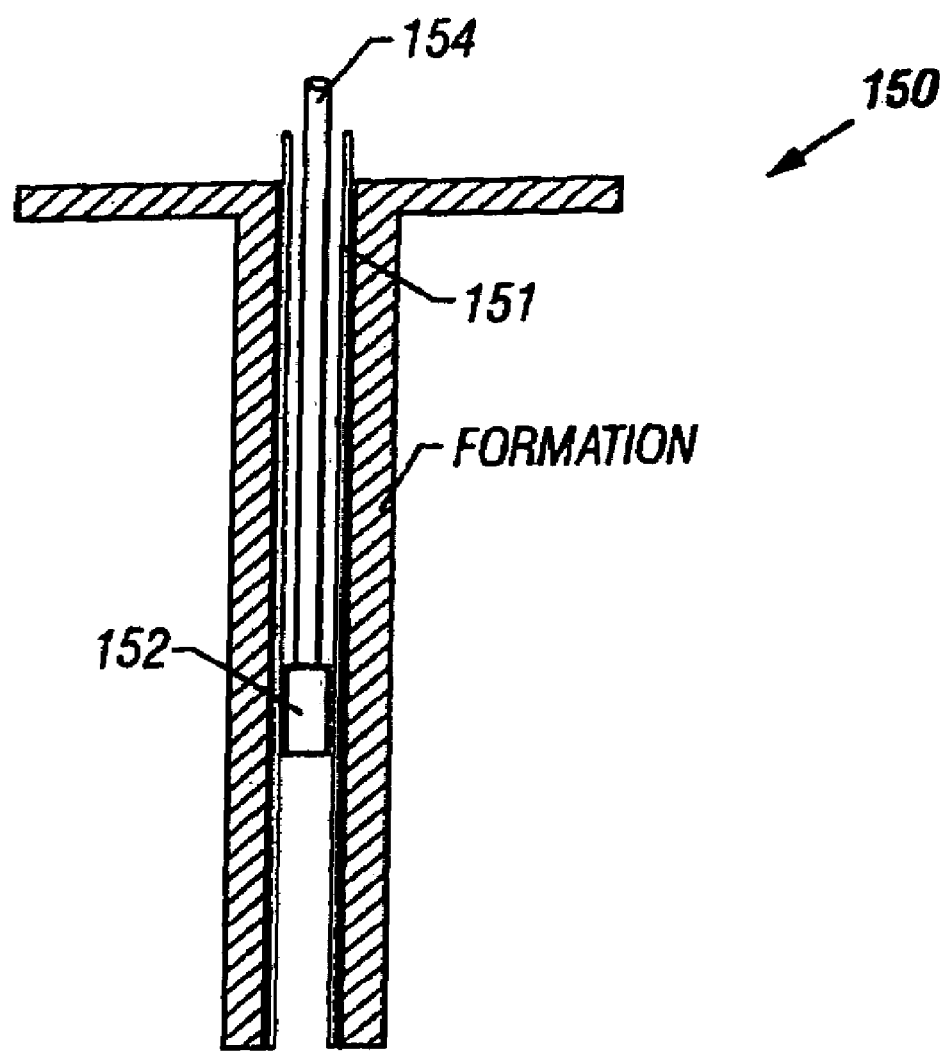
FIG. 28 is a schematic diagram of a system for making an opening in the wall of a downhole tubular in accord with the invention.

While the disclosed implementations of the invention have included a tubular having slotted stations already disposed on its walls prior to installation, the invention may also be implemented with an existing non-slotted tubular already installed in a well. A system 150 for monitoring a characteristic of a reservoir already having a tubular 151 installed is shown in FIG. 28.

A conventional downhole mill-cutter 152 is deployed within the tubular 151 at the end of a transport means 154 such as coiled tubing or a wireline. The mill-cutter 152 is deployed within the tubular 151 to the desired producing zone, where it is activated from the surface to cut one or more slots within the wall of the tubular 151. The mill-cutter is used to cut a slot in the tubular by drilling a series of overlapping holes in the casing using a motor and drill bit with a 90-degree shaft. The motor may be mud-driven or electrically powered.

The slots may also be formed downhole by other approaches, such as the perforation techniques known in the art (not shown). Charges can be designed that cut elliptical holes instead of round ones. They can also be designed to cut wider holes with less penetration. One option is a gun with a number of charges aligned along the axis of the well that perforate overlapping holes.

Another approach is a common service used when drilling a re-entry well from an existing wellbore. A whipstock is placed in the tubular and a mill is attached to the end of a drill string, this assembly is moved down against the whipstock while rotating (not shown). The whip forces the mill against the tubular, eventually cutting a long, elliptical slot in the tubular. Yet another approach is the use of a sandblast jet cutter that is sent downhole to a desired position. With the use of these techniques, one can ensure that the slotted station is at the correct (or best possible) depth for production monitoring.

After making the opening(s) in the tubular 151, the source/sensor system 100 of FIG. 9a is used to deploy an antenna and/or sensor through the tubular 151 to the location where the opening has been formed. Once situated in the vicinity of the opening(s), the source/sensor system 100 is activated to monitor the reservoir characteristic.

4.5.8 Casing Drilling

The slotted casing sections and resistivity tool design and operation described in the previous embodiments may also be implemented as part of a casing drilling system. In a casing drilling system, such as 920, casing sections 925 and the BHA 940 are locked together. Additional sections are added from above such that the first casing section is typically the casing section that remains closest to and locked with the BHA. The BHA 940 is typical of casing drilling BHA designs, which are well known. Common BHA configurations typically consist of a drill bit, an underreamer, and collars associated with locking assemblies. The BHA may also include mud motors and directional drilling motors. According to an embodiment of the disclosed casing drilling system, since the formation evaluation section of the tool 921 does not extend beyond the casing, existing casing drilling BHA designs can be employed without departing from the inventive aspects of the disclosed subject matter. As such and for clarity purposes, the details of the various casing drilling BHA designs are not specifically discussed herein.

To make resistivity measurements according to an embodiment of the disclosed subject matter, a slotted section 926 is used near the BHA 940. The slotted casing section 926 can be similar in design to other slotted section embodiments described herein. Specifically, slotted casing section 926 is a casing section similar in material to casing sections, such casing 925, that are added to the drillstring as the BHA advances downward. Slots 928*a–d*, in slotted casing section 926, allow transmission of signals necessary to make resistivity measurements while providing the mechanical strength that is necessary for drilling operations. Furthermore, the slotted section 926 can contain slots, as described above, that operate to permit transmission of EM radiation.

The casing drilling system 920 includes a lower lock assembly 932 near the BHA 940 and an upper lock assembly 924 near the top of the casing drilling system 920. The upper and lower lock assemblies 924 and 932 perform dual functions for the disclosed casing drilling formation measurement operation. As with typical casing drilling systems, the locking assemblies function to lock the BHA, including the drill bit, to the casing. In this way, the casing rotates with the BHA and applies the downward force needed for drilling.

The locking assemblies 924 and 932 also function to align the resistivity antennas 936a–d to the casing slots 928a–d. Proper alignment between the antennas and slots is important to maximize signal to noise of the resistivity measurements. Locking mechanisms are known within existing casing drilling technology. However, improvements continue to be made with respect to locking systems and the specific casing drilling lock type or operation is not crucial to the disclosed casing drilling formation measurements. Specifically, even misaligned antenna and slot combination is useful in certain circumstances, and any attendant negative signal-to-noise effects may be corrected in processing. It is understood that even correctly aligned slots and antennas will undergo some relative displacement during severe and even normal drilling operations. Yet another function important to obtaining resistivity measurement, the locking assemblies 924 and/or 932 can also be configured to provide a electrically conductive path, providing a short between the casing drilling tool 921 and the casing 925 and/or 926. This short helps attenuate TM waves that may exist internal to the casing 926 and which can interfere with the resistivity readings. It should be noted that any number of shorting components, i.e. bow springs, can be used and the locking assemblies 924 and 932 are not required for this purpose.

Slots 928a–d are shown as multiple slots stacked axial over the slotted casing section 926. Although four slots are discussed for exemplary purposes, any number of actual slots may be employed. In most cases, the number of stacked slots and the number of resistivity antennas are the same, however, this is not necessary. Furthermore, as discussed above with respect to embodiments other than casing drilling, the slot configuration may be of any number of design variations. For example, axial slots such as in FIG. 5 or tilted slots such as in FIG. 14 can be employed based on the same design considerations discussed in reference to those embodiments. Likewise the slots 928 may be tapered as in FIG. 4 or straight as in FIG. 5.

Figure 29:
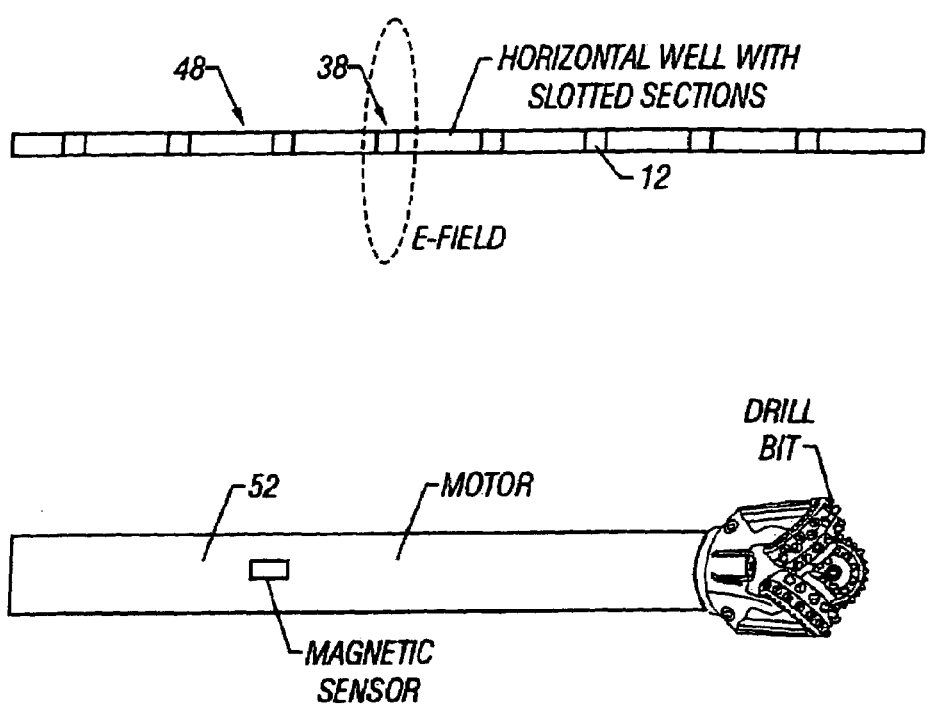
FIG. 29 is a schematic diagram of a well placement system in accord with the invention.
Figure 29A:
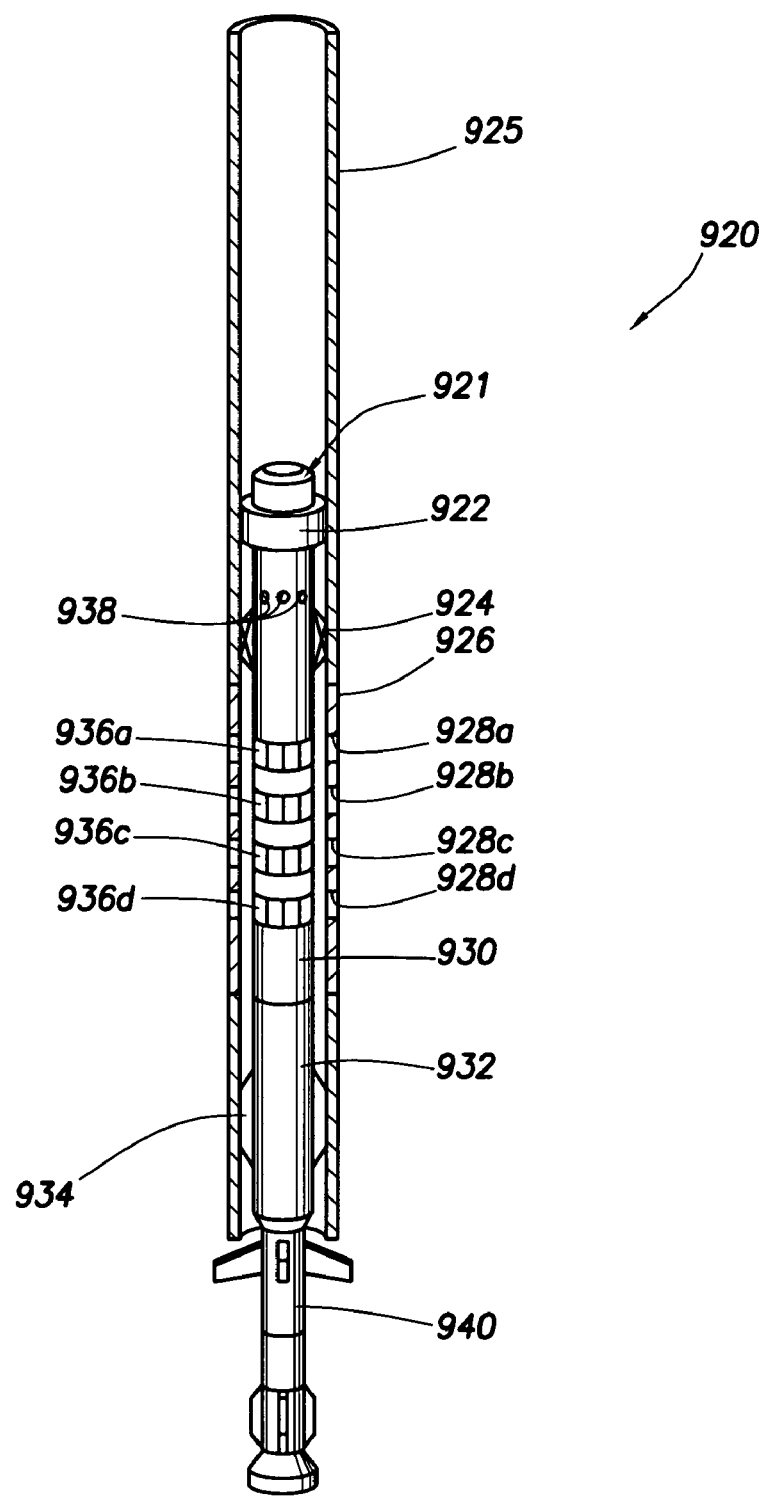
FIG. 29a is a schematic diagram of a casing drilling system in accord with the invention.

Similarly, the stacked antenna configuration of FIG. 29a may be modified as in any of the prior embodiments. Specifically, any one or multiple antennas can be configured as an axial or tilted antenna. Furthermore, a combination of axial and tilted magnetic dipoles can be used. Details of tilted magnetic dipoles and slotted tubulars are known in existing literature. Some examples include, commonly assigned U.S. Pat. Nos. 6,297,639, 6,577,244 and U.S. Published Patent Application Nos. 2003/0200029, 2003/0085707 and 2003/0184302. The flexibility of the antenna and slot configuration is one of the benefits of the disclosed casing drilling system.

Turning back to FIG. 29a, the casing drilling system 920, in one embodiment, also includes seal 922 to ensure mud flow is directed into a central annulus of the casing drilling tool 921. Mud flow flows from a surface station downward through casing sections that have been placed earlier in the casing drilling operation, such as casing section 925. As in existing casing drilling systems the mud is prevented from flowing into the region between the inner surface of the casing and the outer surface of the casing drilling tool 921. Seal designs associated with casing drilling systems are applicable to the disclosed casing drilling system 920, employing formation evaluation components.

In addition to upper seal 922, seals may be utilized near the BHA 940 to prevent return mud flow back through the internal area of the casing. Such a lower seal can be useful to avoid excessive accumulation of debris near the antennas 936a–d. Likewise, seals may be employed to fill the casing slots 928a–d. For example, slot inserts such as shown in FIGS. 3 and 4 can be used to form a barrier between the external and internal casing regions. Because both the lower seal and the slot seals (not shown), if used, are subject to much lower pressure than the upper seal 922, common seal material and designs are available. It should be noted, however, the use of a lower seal and sealed slots is merely a design choice and not a prerequisite for implementing the disclosed formation evaluation measurements.

The electronics 930 associated with antennas 936a–d is used to control the process of transmitting and receiving signals for making formation resistivity measurements. FIG. 15 illustrates an exemplary block diagram of the electronics that may be used to operate the source/sensor casing drilling embodiment.

4.6 Well Placement

FIG. 29 shows another embodiment of the invention. Sometimes it is necessary to place horizontal or deviated wells with a well-defined distance between them. For example, one well could be the producing well, and the other well used for water or steam injection. Drilling the second well parallel to the existing well with a precise separation can be very difficult, as the uncertainties in the geometric positions of the first well and of the drill bit can be large.

In this embodiment, the first well 48 is equipped with a tubular having the slotted stations 12 and antennas 38 as described above. By using a conventional measuring while drilling ("MWD") tool 52 equipped with an appropriate sensor or detector (e.g., an antenna or a triaxial magnetometer), the tool 52 can detect the EM field (represented by dashed lines in FIG. 28) produced by the transmitting antennas 38 located in the first well 48. The sensor may be mounted on the tool 52 body or on the drillstring near the tool 52.

By alternately transmitting from the various antennas 38 in the first well 48, the operator can use the MWD tool 52 to monitor and adjust the orientation of the borehole during drilling. Alternatively, the source may be mounted on the tool 52 or drillstring, with the antennas in the well used as sensors (not shown). In this configuration, the operator would monitor the sensors and adjust the borehole orientation accordingly.

4.7 Implementations of the Invention

Figure 30:
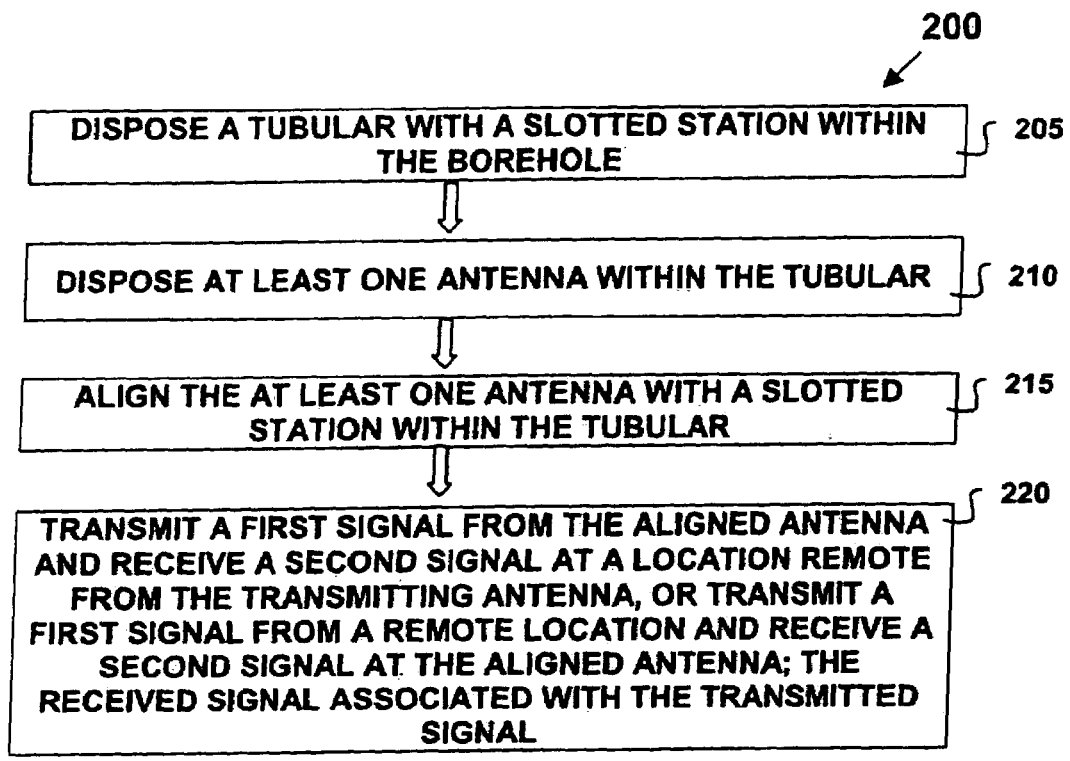
FIGS. 30–35 are flow charts illustrating methods for monitoring a reservoir characteristic in accord with the invention.

FIG. 30 illustrates a flow diagram of a method 200 for monitoring a characteristic of a reservoir surrounding a borehole in accord with the invention. The method comprises disposing a tubular within the borehole, the tubular including at least one station having at least one slot formed therein 205; disposing at least one antenna within the tubular, each at least one antenna adapted to transmit or receive a signal 210; aligning the at least one antenna with at least one slotted station within the tubular 215; and transmitting a first signal from the at least one aligned antenna and receiving a second signal at a location remote from the transmitting antenna, or transmitting a first signal from a remote location and receiving a second signal at the at least one aligned antenna; wherein the received signal is associated with the transmitted signal 220.

Figure 31:
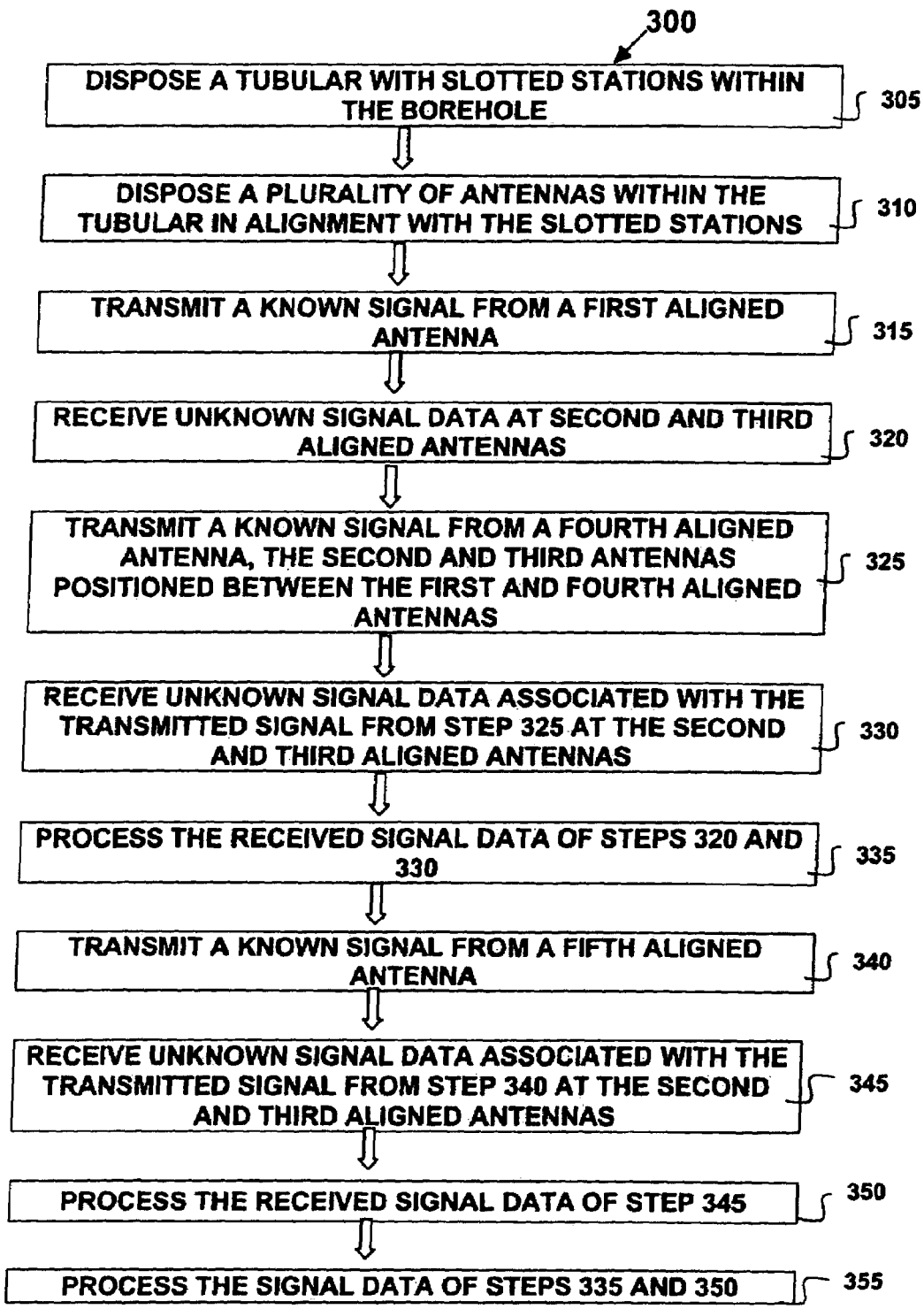

FIG. 31 illustrates a flow diagram of another method 300 for monitoring a characteristic of a reservoir surrounding a borehole in accord with the invention. The method comprises disposing a tubular within the borehole, the tubular including a plurality of stations having at least one slot formed therein 305; disposing a plurality of antennas within the tubular, each antenna positioned in alignment with one of the plurality of slotted stations 310; transmitting a known signal from a first antenna of the plurality of aligned antennas 315; receiving unknown signal data, associated with the known signal, at second and third antennas of the plurality of aligned antennas 320; transmitting a known signal from a fourth antenna, of the plurality of aligned antennas, positioned such that the second and third antennas are between the first and fourth antennas 325; receiving unknown signal data, associated with the transmitted signal of step (325), at the second and third antennas 330; processing the received signal data of steps (320) and (330) 335; transmitting a known signal from a fifth antenna, of the plurality of aligned antennas 340; receiving unknown signal data, associated with the transmitted signal of step (340), at the second and third antennas 345; processing the received signal data of step (345) 350; and processing the signal data of steps (335) and (350) 355.

Figure 32:
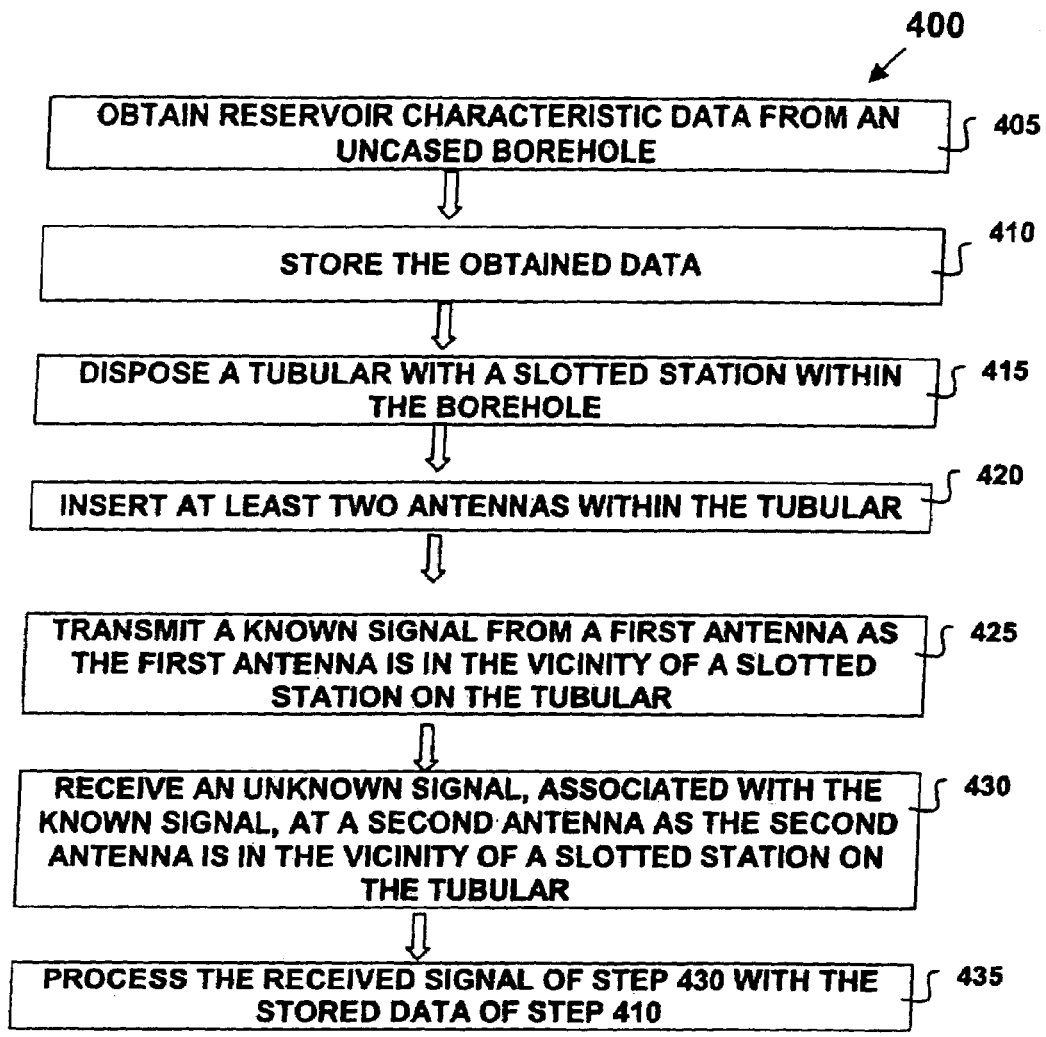

FIG. 32 illustrates a flow diagram of another method 400 for monitoring a characteristic of a reservoir surrounding a borehole in accord with the invention. The method comprises obtaining data representative of the reservoir characteristic from an uncased borehole 405; storing the obtained reservoir data 410; disposing a tubular within the borehole, the tubular including at least one station having at least one slot formed therein 415; inserting at least two antennas within the tubular 420; transmitting a known signal from a first one of the at least two antennas when the first antenna is in the vicinity of at least one slotted station on the tubular 425; receiving an unknown signal, associated with the known signal, at a second one of the at least two antennas when the second antenna is in the vicinity of at least one slotted station on the tubular 430; and processing the received signal of step (430) with the stored data of step (410) 435.

Figure 33:
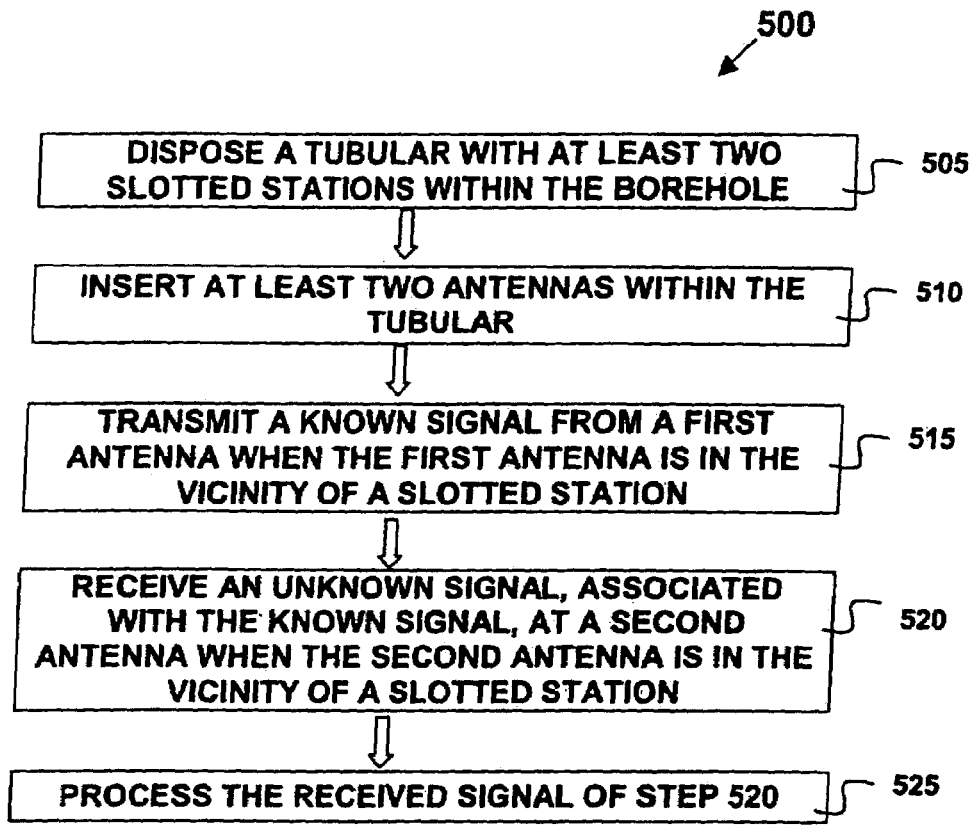

FIG. 33 illustrates a flow diagram of another method 500 for monitoring a characteristic of a reservoir surrounding a borehole in accord with the invention. The method comprises disposing a tubular within the borehole, the tubular including at least two stations having at least one slot formed therein 505; inserting at least two antennas within the tubular 510; transmitting a known signal from a first antenna of the at least two antennas when the first antenna is in the vicinity of a slotted station 515; receiving an unknown signal, associated with the known signal, at a second antenna of the at least two antennas when the second antenna is in the vicinity of a slotted station 520; and processing the received signal of step (510) 525.

Figure 34:
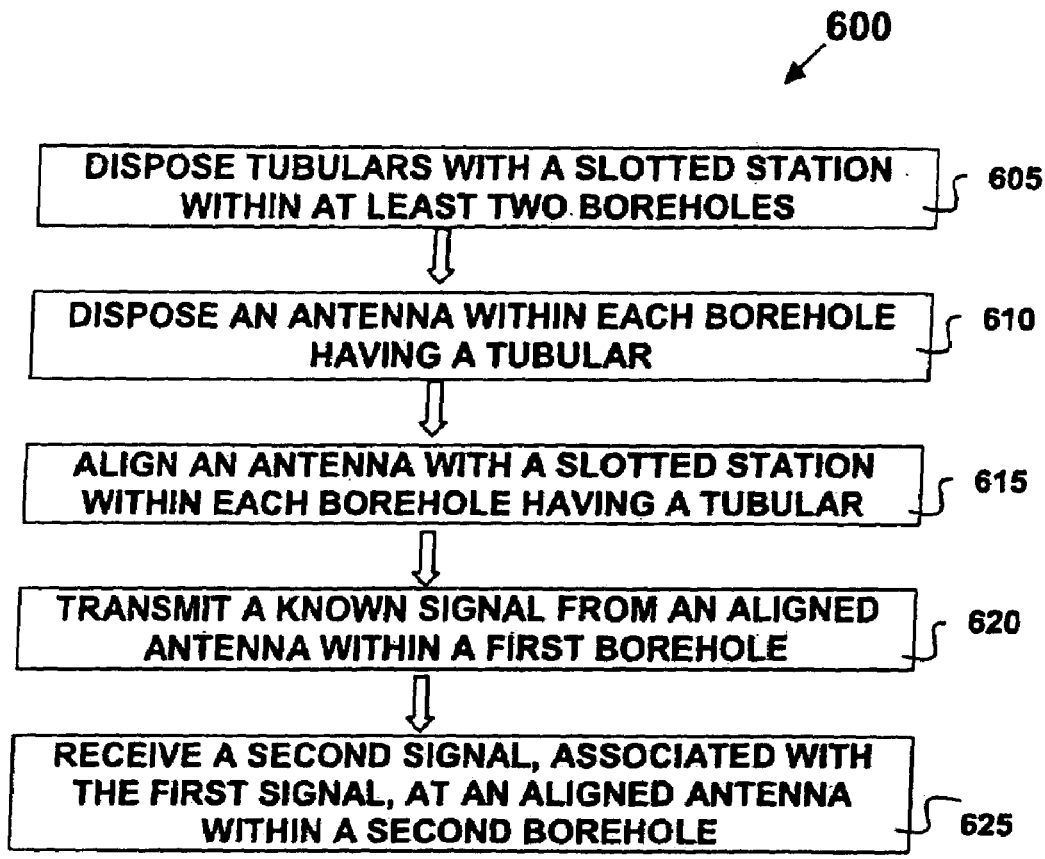

FIG. 34 illustrates a flow diagram of yet another method 600 for monitoring a characteristic of a reservoir, the reservoir being traversed by a plurality of boreholes, in accord with the invention. The method comprises disposing tubulars within at least two boreholes of the plurality of boreholes, each tubular including at least one station having at least one slot formed therein 605; disposing at least one antenna within each of the at least two boreholes having tubulars disposed therein 610; aligning at least one disposed antenna with an at least one slotted station within each of the at least two boreholes 615; transmitting a first signal from the at least one aligned antenna within a first one of the at least two boreholes 620; and receiving a second signal, associated with the first signal, at the at least one aligned antenna within a second one of the at least two boreholes 625.

Figure 35:
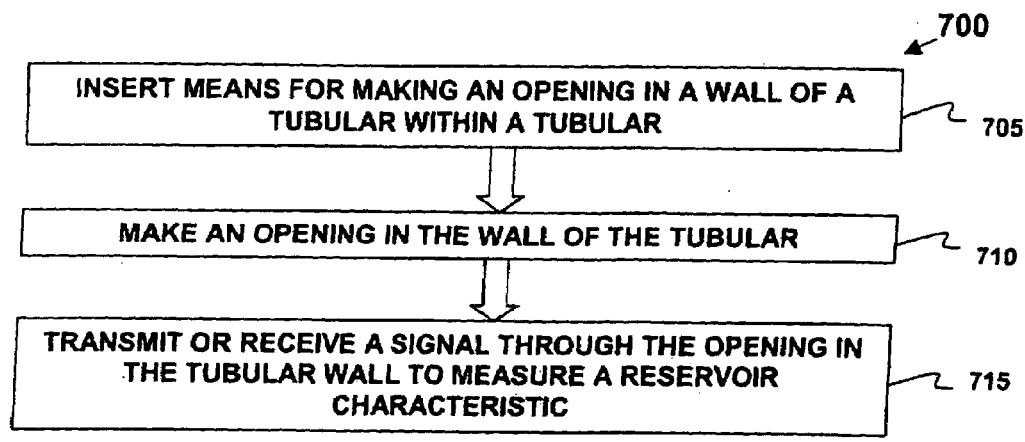

FIG. 35 illustrates a flow diagram of such a method 700 for monitoring a characteristic of a reservoir surrounding a borehole, the borehole having a tubular disposed therein, in accord with the invention. The method comprises inserting into the tubular a means for making an opening in a wall of the tubular 705; making an opening at a desired location in the wall of the tubular 710; and transmitting or receiving a signal through the opening in the tubular wall to measure the reservoir characteristic 715.

Figure 36:
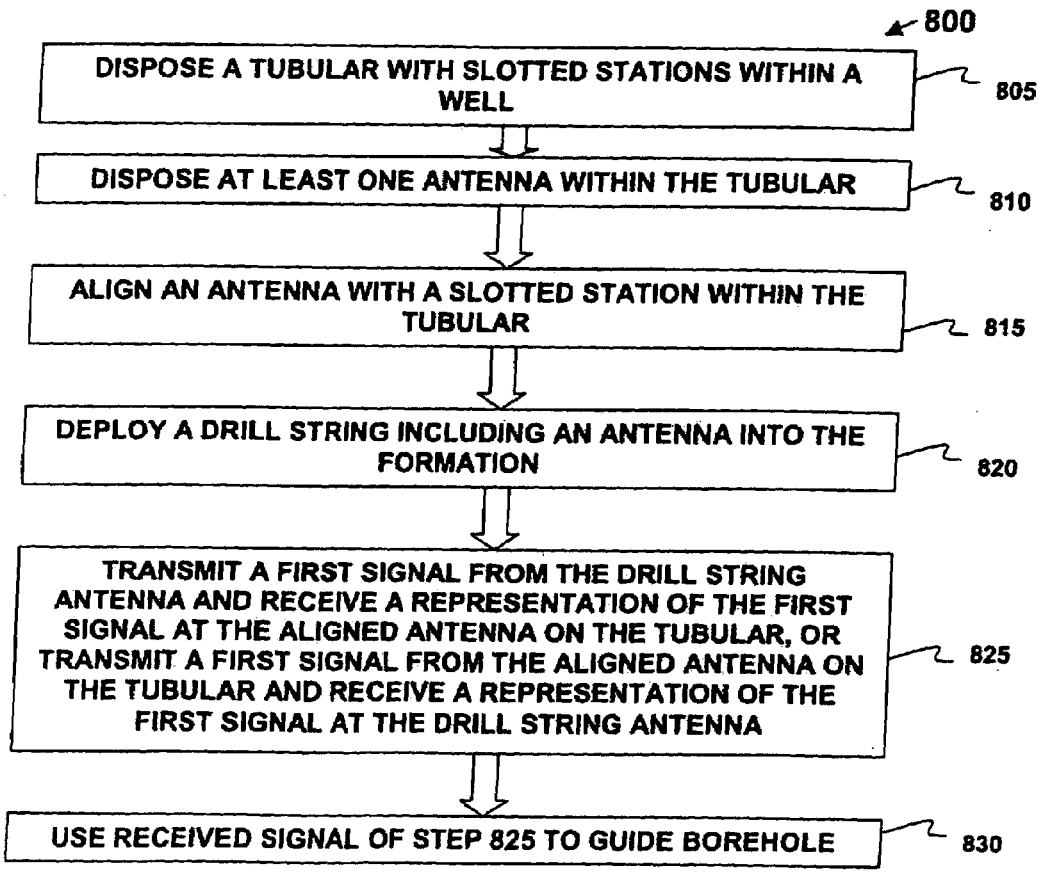
FIG. 36 is a flow chart illustrating a method for placing a borehole in the vicinity of a well in accord with the invention.

FIG. 36 shows a flow diagram of a method 800 for placing a borehole in the vicinity of a well, in an earth formation, in accord with the invention. The method comprises disposing a tubular within the well, the tubular including a plurality of stations, each station having at least one slot formed therein 805; disposing at least one antenna, adapted to transmit or receive a signal, within the tubular 810; aligning at least one antenna with one of the slotted stations within the tubular 815; deploying a drill string into the formation, the drill string including at least one antenna adapted to transmit or receive a signal 820; transmitting a first signal from the at least one antenna on the drill string and receiving a representation of the first signal with the at least one aligned antenna on the tubular, or transmitting a first signal from the at least one aligned antenna on the tubular and receiving a representation of the first signal with the at least one antenna on the drill string 825; and using the received signal of step (825) to guide the placement of the borehole 830.

Figure 37:
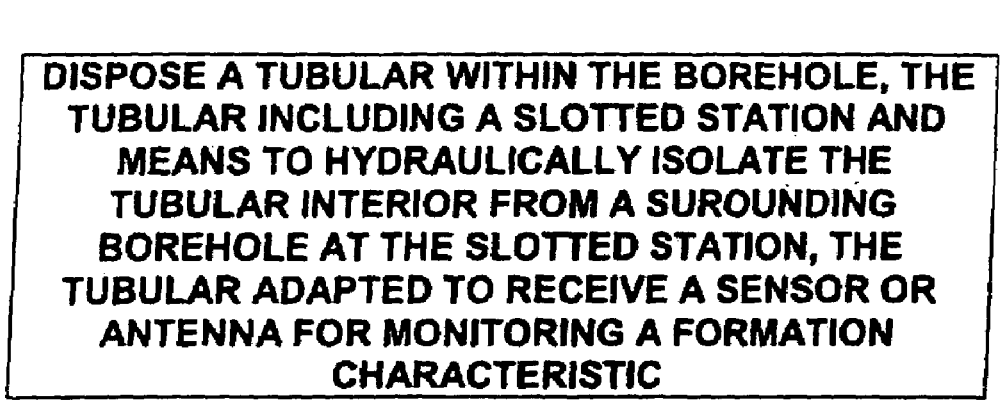
FIG. 37 is another flow chart illustrating a method for monitoring a reservoir characteristic in accord with the invention.

FIG. 37 illustrates a diagram of still another method 900 for monitoring a characteristic of a reservoir surrounding a borehole in accord with the invention. The method comprising disposing a tubular within the borehole, the tubular including at least one station having at least one slot formed therein and means to hydraulically isolate the interior of the tubular from the surrounding borehole at the slotted station, the tubular adapted to receive at least one sensor or antenna for monitoring the formation characteristic.

Figure 38:
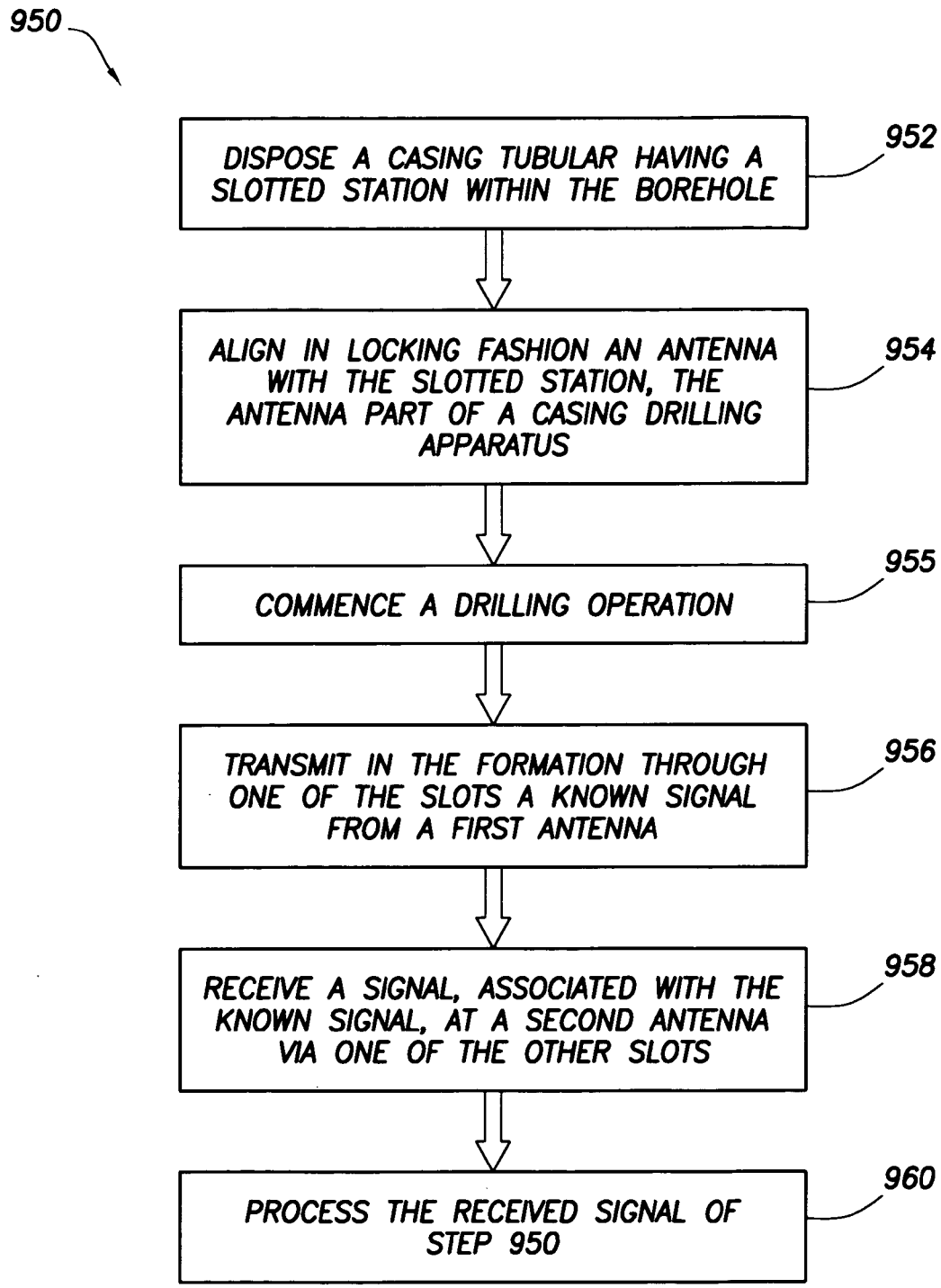

FIG. 38 illustrates a diagram of a method 950 for obtaining resistivity measurements using a casing drilling system, such as shown in FIG. 29a. Beginning at step 952, a slotted casing section is lowered into a borehole. If casing sections already exist within the borehole, slots can be cut within the casing while in the borehole. At step 954, a casing drilling tool is lowered into the casing, now including the slotted casing section. The casing drilling tool is locked into place with the casing at a location near the slotted casing section. The locking mechanism on the casing drilling tool is positioned to align resistivity antennas, also found on the casing drilling tool, with the slots located in the slotted section of the casing. In part, to allow overall length of the casing drilling tool to be minimized, the slotted casing section is typically located near the lowest point of the casing string.

Once the casing drilling tool is in place, at step 955, the casing string traverses the borehole as a drilling operation commences. It should be understood that drilling operations as referenced herein include, vertical drilling, horizontal drilling, tripping, sliding or similar operations where a casing drilling string in motion relative to the formation. During one of these drilling operations, at step 956, electronics within the casing drilling tool excite one or more antennas to transmit into the formation an electromagnetic signal capable of passage through one or more slots in the slotted casing section. At step 958, in response to the transmitted signal, a signal is received from the formation through one or more of the slots.

At Step 960, electronics within the casing drilling tool records the response for later processing, for example after the drilling operation is completed. Alternatively, processing of the received signal may be performed downhole to obtain real time or near real time resistivity measurements. In either case, a casing drilling tool equipped with mud pulse telemetry is able to transmit the gathered information to a surface station. In some operations, additional slotted casing sections can be added as the casing drilling tool progresses further downhole. Where multiple slotted casing sections exist, resistivity measurements can be made as the casing drilling tool is retrieved from its drilling position, for example for maintenance or to change the drill bit.

While the methods and systems of this invention have been described as specific embodiments, it will be apparent to those skilled in the art that variations may be applied to the structures and in the steps or in the sequence of steps of the methods described herein without departing from the concept and scope of the invention. For example, the disclosed inventions may also be implemented using different types of signal sources and/or sensors, including those adapted for sonic, neutron, gamma, or magnetic signals. All such similar variations apparent to those skilled in the art are deemed to be within this concept and scope of the invention as defined by the appended claims.

What is claimed is:

1. A casing drilling system for monitoring a characteristic of a reservoir surrounding a borehole, comprising
    a borehole, comprising:
    a casing drilling assembly having a drill bit for drilling a borehole;
    a casing tubular coupled to the casing drilling assembly, the casing tubular disposed within the borehole, the casing tubular including at least one station having at least one slot formed therein;
    at least one antenna or sensor, adapted for transmission and/or reception of a signal, disposed within the casing tubular and positioned such that the antenna or sensor is aligned with the at least one slotted station; and
    means for activating the at least one antenna or sensor to transmit and/or receive a signal.

2. The system of claim 1, wherein the reservoir characteristic is resistivity.

3. The system of claim 1, wherein at least one slot is formed at the at least one station such that the slot is sloped at an angle with respect to the longitudinal axis of the casing tubular.

4. The system of claim 1, wherein the transmitted or received signal consists of electromagnetic energy.

5. The system of claim 1, wherein the at least one antenna or sensor is permanently or temporarily disposed within the casing tubular.

6. The system of claim 1, wherein a first signal is transmitted from the at least one aligned antenna and a second signal is received at a location remote from the transmitting antenna, or
    a first signal is transmitted from a remote location and a second signal is received
    at the at least one aligned antenna or sensor; wherein the received signal is associated with the transmitted signal.

7. The system of claim 1, wherein the at least one antenna or sensor is mounted on a well tool, the tool being adapted for deployment with the casing drilling assembly.

8. The system of claim 7, the tool further comprising means to centralize the tool within the casing tubular and/or means to provide a conductive path between the tool and the casing tubular.

9. The system of claim 1, wherein the at least one slotted station comprises isolation means to provide hydraulic isolation at the at least one slot.

10. A casing drilling system for monitoring a characteristic of a reservoir surrounding a borehole, comprising:
    means for making an opening in a wall of a casing tubular disposed within the borehole, the means being adapted for deployment through the tubular to a desired location in the tubular; and
    a casing drilling assembly having a drill bit for drilling a borehole;
    a casing tubular coupled to the casing drilling assembly, the casing tubular disposed within the borehole, the casing tubular including at least one station having at least one slot formed therein;
    at least one antenna or sensor, adapted for transmission and/or reception of a signal, disposed within the casing tubular and positioned such that the antenna or sensor is aligned with the at least one slotted station; and
    means for activating the at least one antenna or sensor to transmit and/or receive a signal.

11. The system of claim 10, wherein the transmitted or received signal consists of electromagnetic energy.

12. The system of claim 10, the tool further comprising means to provide a conductive path between the tool and the tubular.

13. A method for monitoring during a drilling operation a characteristic of a reservoir surrounding a borehole, comprising:
    a) disposing a casing tubular within the borehole, the casing tubular including at least one station having at least one slot formed therein;
    b) disposing at least one antenna within the casing tubular, each at least one antenna adapted to transmit or receive a signal;
    c) aligning the at least one antenna with at least one slotted station within the casing tubular;
    d) locking the casing tubular to a casing drilling apparatus, maintaining alignment with the antenna and the slotted station;
    e) commence a drilling operation; and
    f) transmitting, during the drilling operation, a first signal from the at least one aligned antenna and receiving a second signal associated with the transmitted signal.

14. The method of claim 13, wherein the reservoir characteristic is resistivity.

15. The method of claim 13, wherein the first and second signals of steps (d) consist of electromagnetic energy.

16. The method of claim 13, further comprising:
    (e) determining the phase and/or amplitude of the received signal.

17. The method of claim 16, further comprising:
    (f) relating the determined phase and/or amplitude to corresponding reservoir resistivities; and
    (g) relating the corresponding reservoir resistivities to reservoir oil saturations.

18. The method of claim 13, further comprising:
    e) processing the received signal of step (d).

19. The method of claim 18, wherein step (e) includes using a theoretical model to determine the reservoir characteristic.

20. A method for monitoring during drilling operations a characteristic of a reservoir surrounding a borehole, the borehole having a casing tubular disposed therein, comprising:
- a) inserting into the casing tubular a means for making an opening in a wall of the casing tubular;
- b) making at least one opening at a desired location in the wall of the casing tubular; and
- c) disposing at least one antenna within the casing tubular, each at least one antenna adapted to transmit or receive a signal;
- d) aligning the at least one antenna with the at least one opening within the casing tubular;
- e) locking the casing tubular to a casing drilling apparatus, maintaining alignment of the antenna and the opening;
- f) commence a drilling operation; and
- g) transmitting, during the drilling operation, a first signal from the at least one aligned antenna and receiving a second signal associated with the transmitted signal.

21. The method of claim 20, wherein the reservoir characteristic is resistivity.

22. The method of claim 20, wherein the transmitted or received signal of step (c) consists of electromagnetic energy.

23. The method of claim 20, further comprising:
- h) determining the phase and/or amplitude of the received signal.

24. The method of claim 23, further comprising:
- (i) relating the determined phase and/or amplitude to corresponding reservoir resistivities; and
- (j) relating the corresponding reservoir resistivities to reservoir oil saturations.

* * * * *